US011038685B1

(12) United States Patent
Dennis

(10) Patent No.: US 11,038,685 B1
(45) Date of Patent: Jun. 15, 2021

(54) CORRECTING BLOCKCHAIN TRANSACTIONS WITH CRYPTOCURRENCY TYPE MISTAKES

(71) Applicant: Turing Technology, Inc., Redwood City, CA (US)

(72) Inventor: Stewart MacGregor Dennis, Redwood City, CA (US)

(73) Assignee: Turing Technology, Inc., Redwood City, CA (US)

( * ) Notice: Subject to any disclaimer, the term of this patent is extended or adjusted under 35 U.S.C. 154(b) by 291 days.

(21) Appl. No.: 16/362,169

(22) Filed: Mar. 22, 2019

(51) Int. Cl.
*H04L 9/32* (2006.01)
*H04L 9/06* (2006.01)
*H04L 9/14* (2006.01)
*H04L 9/08* (2006.01)

(52) U.S. Cl.
CPC .......... *H04L 9/3213* (2013.01); *H04L 9/0643* (2013.01); *H04L 9/085* (2013.01); *H04L 9/14* (2013.01); *H04L 2209/38* (2013.01)

(58) Field of Classification Search
CPC ..... H04L 9/3213; H04L 9/085; H04L 9/0643; H04L 9/14; H04L 2209/38
See application file for complete search history.

(56) References Cited

U.S. PATENT DOCUMENTS

| 10,102,265 | B1* | 10/2018 | Madisetti | G06Q 20/06 |
| 10,289,631 | B2* | 5/2019 | Madisetti | H04L 9/3239 |
| 10,394,845 | B2* | 8/2019 | Madisetti | G06Q 20/3829 |
| 10,853,772 | B2* | 12/2020 | Madisetti | G06Q 20/0658 |
| 2015/0332256 | A1* | 11/2015 | Minor | G06Q 20/381 705/69 |
| 2016/0342977 | A1* | 11/2016 | Lam | G06Q 20/0658 |
| 2018/0068282 | A1* | 3/2018 | Patel | G06Q 20/023 |
| 2019/0188706 | A1* | 6/2019 | McCurtis | G06Q 20/02 |
| 2019/0220854 | A1* | 7/2019 | Pesci | G06Q 20/381 |
| 2019/0287100 | A1* | 9/2019 | Song | G06Q 20/0658 |

(Continued)

FOREIGN PATENT DOCUMENTS

WO 2018189657 A1 10/2018

OTHER PUBLICATIONS

Bouguila et al., "A discrete mixture-based kernal for SVMs: Application to spam and image categorization," Information Processing & Management, vol. 45, Issue 6, Nov. 2009, pp. 631-642.

(Continued)

*Primary Examiner* — J. Brant Murphy
(74) *Attorney, Agent, or Firm* — Haynes Beffel & Wolfeld LLP

(57) ABSTRACT

Systems and techniques are provided for blockchain transactions where tokens of a first token type are transferred to a blockchain address of the second token type, the first token type being different than the second token type. In a specific implementation, a token exchange system receives blockchain blocks from one or more blockchain networks. The token exchange system identifies a wrong token type blockchain transaction in the blockchain blocks where the wrong token type blockchain transaction transfers tokens of the first token type to a blockchain address associated with the second token type. The token exchange system executes a fix token type blockchain transaction to correct the wrong token type blockchain transaction.

33 Claims, 15 Drawing Sheets

(56) References Cited

U.S. PATENT DOCUMENTS

| | | | | |
|---|---|---|---|---|
| 2019/0311337 | A1* | 10/2019 | Madisetti | G06Q 20/38215 |
| 2020/0026785 | A1* | 1/2020 | Patangia | H04L 63/123 |
| 2020/0027067 | A1* | 1/2020 | Hertzog | H04L 9/3239 |
| 2020/0074450 | A1* | 3/2020 | Fletcher | G06Q 20/36 |
| 2020/0389321 | A1* | 12/2020 | Fletcher | G06Q 20/36 |

OTHER PUBLICATIONS

Boykin et al., "Leveraging Social Networks to Fight Spam," IEEE, Apr. 2005, 8 pages.

Crispin, M., "Internet Message Access Protocol," version 4rev1, Mar. 2003, 108 pages.

Fdez-Riverola et al., "SpamHunting: An Instance-Based Reasoning System for Spam Labelling and Filtering," Decision Support Systems v43, Issue 3, Apr. 2007, 34 pages.

Klensin, "RFC 5321—Simple Mail Transfer Protocol," Oct. 2008, 83 pages.

Myers et al., "RFC 1939—Post Office Protocol," May 1996, 21 pages.

Salehi et al., "Enhanced genetic algorithm for spam detection in email," 2011 IEEE 2nd Int'l Conf. on Software Engineering and Service Science, Beijing, Jul. 15-17, 2011, pp. 594-597.

Salehi et al., "Hybrid simple artificial immune system (SAIS) and particle swarm optimization (PSO) for spam detection," 2011 Malaysian Conference in Software Engineering, Johor Bahru, Dec. 13-14, 2011, pp. 124-129.

King et al, PPCoin: Peer-to-Peer Crypto-Currency with Proof-of-Stake, Aug. 19, 2012, pp. 1-6.

U.S. Appl. No. 15/845,904—filed Dec. 18, 2017, 80 pages.
U.S. Appl. No. 16/268,272—filed Feb. 5, 2019, 60 pages.
U.S. Appl. No. 16/268,291—filed Feb. 5, 2019, 56 pages.
U.S. Appl. No. 16/268,323—filed Feb. 5, 2019, 59 pages.
U.S. Appl. No. 16/541,100—filed Aug. 14, 2019, 38 pages.

* cited by examiner

PARTICIPANT 402

| USER ID 502 | NAME 504 | OPTIONAL 506 |
|---|---|---|
| 1001 | John E. Murphy | |
| 1002 | Fernando C. Cash | |
| 1003 | Jonathon Smith | |
| 1004 | Kristine B. Odaniel | |
| 1005 | Carl N. Brewington | |
| 1006 | Brandon R. Rufus | |

FIG. 5

REGISTRY OF BLOCKCHAIN ADDRESSES 404

| USER ID 502 | PRIVATE KEY FOR WALLET SERVICE 604 | TOKEN TYPE 606 | BLOCKCHAIN ADDRESS 608 | TOKEN BALANCE 610 | OPTIONAL 612 |
|---|---|---|---|---|---|
| 1001 | [Private Key for wallet service I] | A | F9kdY9D6 | 100 | |
| 1001 | [Private Key for wallet service I] | B | HHQJyXBu | 2000 | |
| 1001 | [Private Key for wallet service II] | C | J8FDVH9LM4 | 617 | |
| 1001 | [Private Key for wallet service II] | D | VMZHF5LAX3 | 890 | |
| 1001 | [Private Key for wallet service III] | F | OGALEQGXVPTO | 10000 | |
| 1002 | [Private Key for wallet service II] | C | 2KWZ2FQT87 | 23 | |
| 1002 | [Private Key for wallet service II] | D | 3HCJYXRA8C | 4321 | |
| 1002 | [Private Key for wallet service III] | G | VAEBTTNJNLTU | 35246 | |

FIG. 6

REGISTRY FOR TOKEN EXCHANGE REQUESTS — 412

| REQUEST ID | USER ID | CATEGORY | SOURCE BLOCKCHAIN ADDRESS | DESTINATION BLOCKCHAIN ADDRESS | TOKEN TYPE FOR SOURCE BLOCHAIN ADDRESS | TOKEN TYPE FOR DESTINATION BLOCHAIN ADDRESS | TOKEN AMOUNT | OPTIONAL |
|---|---|---|---|---|---|---|---|---|
| 101 | 1001 | MARKET SELL | F9kdY9D6 | HHQJyXBu | A | B | 100 | |
| 102 | 1001 | MARKET ORDER | HHQJyXBu | J8FDVH9LM4 | B | C | 6548 | |
| 103 | 1001 | LIMIT SELL | OGALEQGXVPTO | F9kdY9D6 | F | A | 50 | |
| 104 | 1002 | LIMIT ORDER | 2KWZ2FQT87 | 3HCJYXRA8C | C | D | 10 | |

EXECUTED EXCHANGE TRANSACTIONS

| TRANSACTION ID | USER ID | SOURCE BLOCKCHAIN ADDRESS | TOKENS WITHDRAWN FROM SOURCE BLOCKCHAIN ADDRESS | DESTINATION BLOCKCHAIN ADDRESS | TOKENS DEPOSITED TO DESTINATION BLOCKCHAIN ADDRESS | OPTIONAL |
|---|---|---|---|---|---|---|
| 101 | 1001 | F9kdY9D6 | 100 | HHQJyXBu | 200 | |
| 102 | 1001 | HHQJyXBu | 2050 | J8FDVH9LM4 | 6548 | |
| 103 | 1001 | OGALEQGXVPTO | 50 | F9kdY9D6 | 500 | |
| 104 | 1002 | 2KWZ2FQT87 | 20 | 3HCJYXRA8C | 10 | |
| 105 | 1002 | 3HCJYXRA8C | 200 | VAEBTTNJNLTU | 600 | |

950

| SOURCE BLOCKCHAIN ADDRESS ⟋952 | DESTINATION BLOCKCHAIN ADDRESS ⟋954 | TIMESTAMP ⟋956 | TOKEN ⟋958 |
|---|---|---|---|
| K6JVXGY2WY | J8FDVH9LM4 | 2017-09-12T22:56:33+00:00 | 2000 |

FIG. 9B

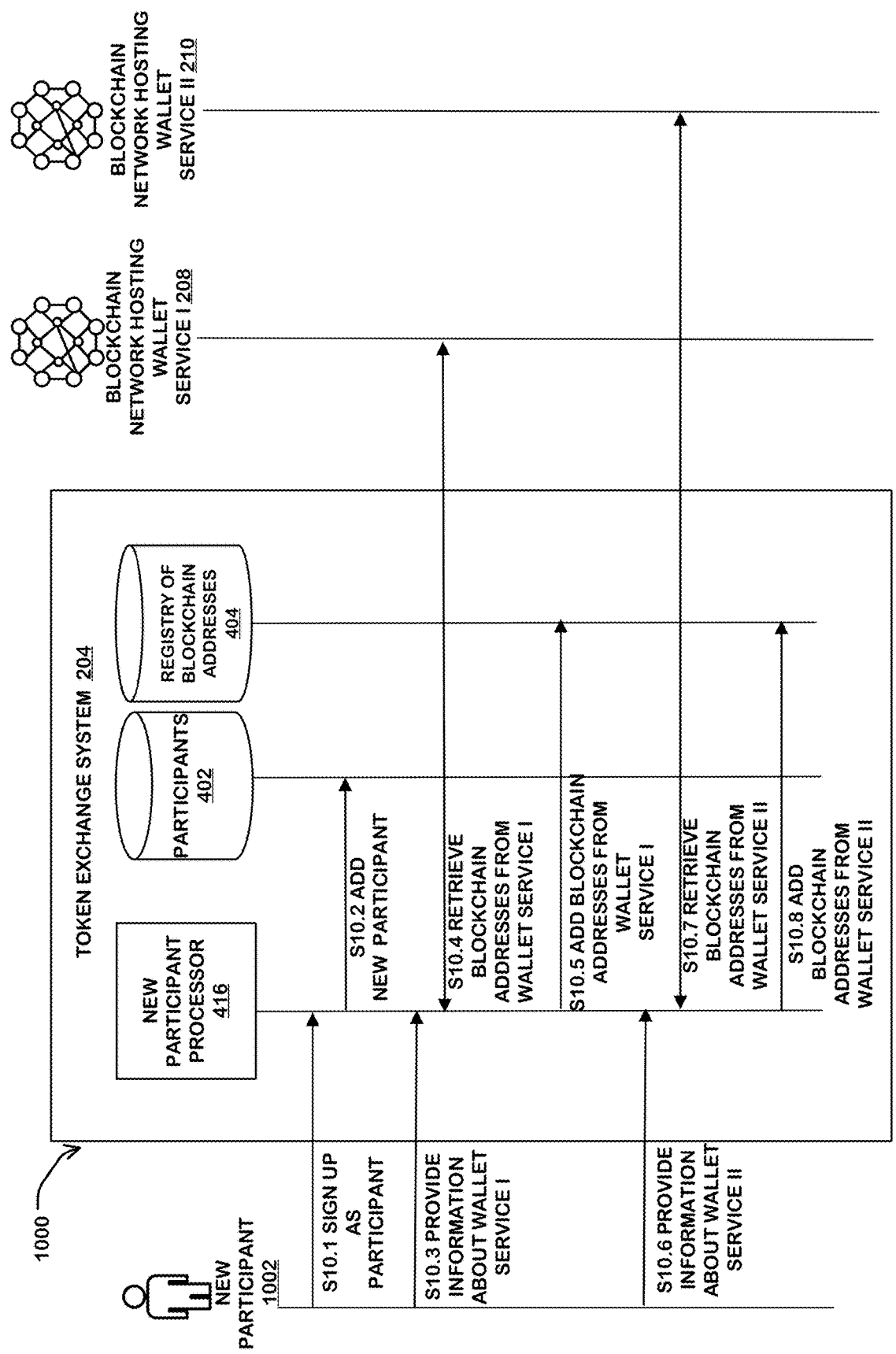

CORRECTING BLOCKCHAIN TRANSACTIONS WITH CRYPTOCURRENCY TYPE MISTAKES

BACKGROUND

Field

The present invention relates to blockchain technology. More particularly, the invention relates to methods and systems for cryptocurrency transactions using blockchain technology.

Description of Related Art

Cryptocurrency is a digital asset that allows for the secure payments of online transactions that are denominated in terms of a virtual "token." Cryptocurrency or the virtual tokens are designed to work as a medium of exchange in secure transactions between two parties by using cryptography for security and prevention of counterfeiting and/or fraud. Numerous cryptocurrencies exist today such as Bitcoin™, Ethereum™ Credo™, Bitcoin Cash™, Ripple™, Litecoin™, Dash™, Peercoin™, Namecoin™ Dogecoin™, Primecoin™, and Mastercoin™.

Cryptocurrency transactions between parties are stored as blockchain transactions in blockchain networks. A blockchain network is a decentralized and distributed system that hosts electronic ledgers that can record transactions efficiently and in a verifiable and permanent way. The electronic ledgers comprise blocks of blockchain transactions and other information pertinent to the blocks. Each transaction encodes a transfer of control of a number of cryptocurrency or tokens between two or more participants in the blockchain network, senders and recipients. Each block contains a cryptographic hash of the previous block, thereby creating a chain of blocks or a "blockchain." The blockchain creates a permanent and unalterable electronic ledger of all transactions which have been written to the blockchain since its inception. Examples of popular blockchain platforms include Ethereum™, Eris™, Multichain™, Bitcoin™, Litecoin™, Hyperledger Fabric™, Credo Blockchain™, and Hyperledger Corda™.

A blockchain transaction can occur between two or more participants, senders and recipients. The blockchain transaction can be associated with a source blockchain address and a destination blockchain address. Both the source blockchain address and the destination blockchain address are cryptographic addresses unique to the sender and the recipient respectively. The source blockchain address is generated using a public key associated with a private key of the sender of the tokens in the transaction. The destination blockchain address is generated using a public key associated with a private key of the recipient of the tokens in the transaction. The private key of the recipient is used to sign transactions that claim the tokens transferred to the destination blockchain address.

The private keys for the participants can be stored in a digital "wallet." A digital wallet is a software program that maintains blockchain addresses and private keys held by the participants and supports the execution of blockchain transactions by which users send or receive cryptocurrency, pay for goods or save cryptocurrency. Numerous wallet services exist today such as Coinbase™, Bread Wallet™, Mycelium™, Exodus™, Copay™, Jaxx™, Armory™, Trezor™, Ledger Nano™, Green Address™, and Blockchain.info™.

A blockchain network can support only one type of cryptocurrency or token type. For example, the blockchain network Credo Blockchain™ supports the cryptocurrency Credo™. A blockchain network can also support more than one token type. For example, the blockchain network Bitcoin™ supports the token types Bitcoin™, Bitcoin Cash™ Bitcoin SV™, Bitcoin Gold™, and Bitcoin Diamond™, the blockchain network Ethereum™ supports the token types Ethereum™, Ethereum Classic™, and Ethereum 20™, and the blockchain network Litecoin™ supports the token types Litecoin™ Litecoin Cash™ and Litecoin Plus™.

Cryptocurrency transactions or transfers of tokens to destination blockchain addresses can be prone to errors. A destination blockchain address for a first token type can be assigned during the initiation and execution of a blockchain transaction for transferring tokens of a second token type. For example, Bitcoin™ tokens can be sent to a blockchain address associated with Bitcoin Cash™, or Bitcoin™ tokens can be sent to a blockchain address associated with Ethereum Classic™. Tokens sent to a destination blockchain address of the wrong token type will result in the unaccountability of the tokens when estimating the total number of tokens held by the destination blockchain address.

Thus, it is desirable to provide a method of detecting blockchain transactions where tokens are transferred to destination blockchain addresses of the wrong token types and correct such blockchain transactions in order to ensure the accountability of the tokens in the future.

SUMMARY

A system and a method for a node are provided that can be used for detecting and correcting blockchain transactions transferring tokens of a first token type to a blockchain address for a second token type.

In the technology described herein, the node receives blockchain blocks from one or more blockchain networks. The blockchain blocks comprise blockchain transactions transferring tokens of a token type from a plurality of token types. The plurality of token types includes at least a first token type and a second token type. The node identifies wrong token type blockchains in the blockchain blocks received from the blockchain networks. A wrong token type blockchain transaction transfers tokens of the first token type to a blockchain address associated with the second token type. The node executes a fix token type blockchain transaction to transfer the tokens of the first token type from the blockchain address associated with the second token type to a blockchain address associated with the first token type. Therefore, the tokens are accounted for when estimating the total number of tokens held by the blockchain address of the first token type.

In some embodiments, the node maintains a registry of blockchain addresses. The registry of blockchain addresses includes blockchain addresses of the participants of cryptocurrency transactions and token balances associated with respective blockchain addresses. Each of the blockchain addresses in the registry of blockchain addresses is associated with a token type from the plurality of token types.

In some embodiments, the node may select the blockchain address associated with the first token type from the registry of blockchain addresses by matching an identifier of the blockchain address associated with the first token type with an identifier of the blockchain address associated with the second token type. The identifier of the blockchain address associated with the first token type and the identifier of the blockchain address associated with the second token type may be a private key needed to sign blockchain transactions associated with the first token type and the blockchain address associated with the second token type. In some embodiments, blockchain addresses that can have outgoing blockchain transactions signed with a private key have a common blockchain address format.

In some embodiments, the node may identify deposit blockchain transactions in the blockchain blocks received from the blockchain networks. The deposit blockchain transactions transfer tokens to blockchain addresses in the registry of blockchain addresses. The node updates token balances of the blockchain addresses in the registry of blockchain addresses upon identification of the deposit blockchain transactions transferring tokens to the blockchain addresses.

In some embodiments, the node executes withdrawal blockchain transactions, the blockchain transactions transferring tokens from blockchain addresses in the registry of blockchain addresses to other blockchain address. The node updates token balances of the blockchain addresses in the registry of blockchain addresses.

In some embodiments, the node maintains a registry of token exchange requests. The registry of token exchange includes a queue of token exchange requests. A token exchange request requests an exchange of tokens of the first token type for tokens of the second token type. In some embodiments, the node may receive token exchange requests, and add the received token exchange requests to the registry of token exchange requests. In some embodiments, the node may select a token exchange request from the registry of token exchange requests where the token exchange request requests a first number of tokens of the first token type from a first blockchain address to tokens of the second type to a second blockchain address. The node may execute a blockchain transaction transferring a first number of tokens of the first token type from the first blockchain address, determine a second number of tokens of the second token type equivalent to the first number of tokens of the first token type on dependence upon a token exchange rate of the first token type and the second token type, and execute a blockchain transaction transferring the second number of tokens of the second token type to the second blockchain address.

Embodiments of the technology described herein, or elements thereof, can be implemented in the form of a computer product including a non-transitory computer-readable storage medium with the computer usable program code comprising logic for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 5 is a symbolic drawing indicating how the participants database in FIG. 4 is organized, according to an embodiment of the invention.

FIG. 6 is a symbolic drawing indicating how the database including the registry of blockchain addresses database in FIG. 4 is organized, according to an embodiment of the invention.

FIG. 7 is a symbolic drawing indicating how the database including the registry of token exchange requests in FIG. 4 is organized, according to an embodiment of the invention.

FIGS. 9A and 9B (hereafter FIG. 9) illustrate an example blockchain data structure in a blockchain network that implements the technology disclosed.

FIG. 10 is a sequence diagram illustrating a representative method of processing a new user in the token exchange system by the new user processor in FIG. 4.

DETAILED DESCRIPTION

A detailed description of embodiments of the present invention is provided with reference to the FIGS. 1-14. The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

A token exchange system enables the exchange of tokens of one token type (e.g., Bitcoin™) into another token type (e.g., Credo™). The token exchange service may receive a number of tokens from a participant of the token exchange system in the form of one token type to exchange for a number of tokens in the form of a second token type equivalent to the received tokens from the participant. The token exchange system may enable exchanges between a plurality of token types. For example, a token exchange system may enable token exchanges between the token types Credo™, Bitcoin™, Bitcoin Cash™, Bitcoin SV™, Bitcoin Gold™, Bitcoin Diamond™, Ethereum™, Ethereum Classic™, Ethereum 20™, Litecoin™, Litecoin Cash™, and Litecoin Plus™. Examples of token exchange systems include Coinbase™, Coinmama™, Binance™, CredoEx™, Changelly™, etc. In some embodiments, the token exchange system can be any cryptocurrency services (e.g., e-commerce websites) that enable transactions in multiple token types or cryptocurrencies.

Figure 1:
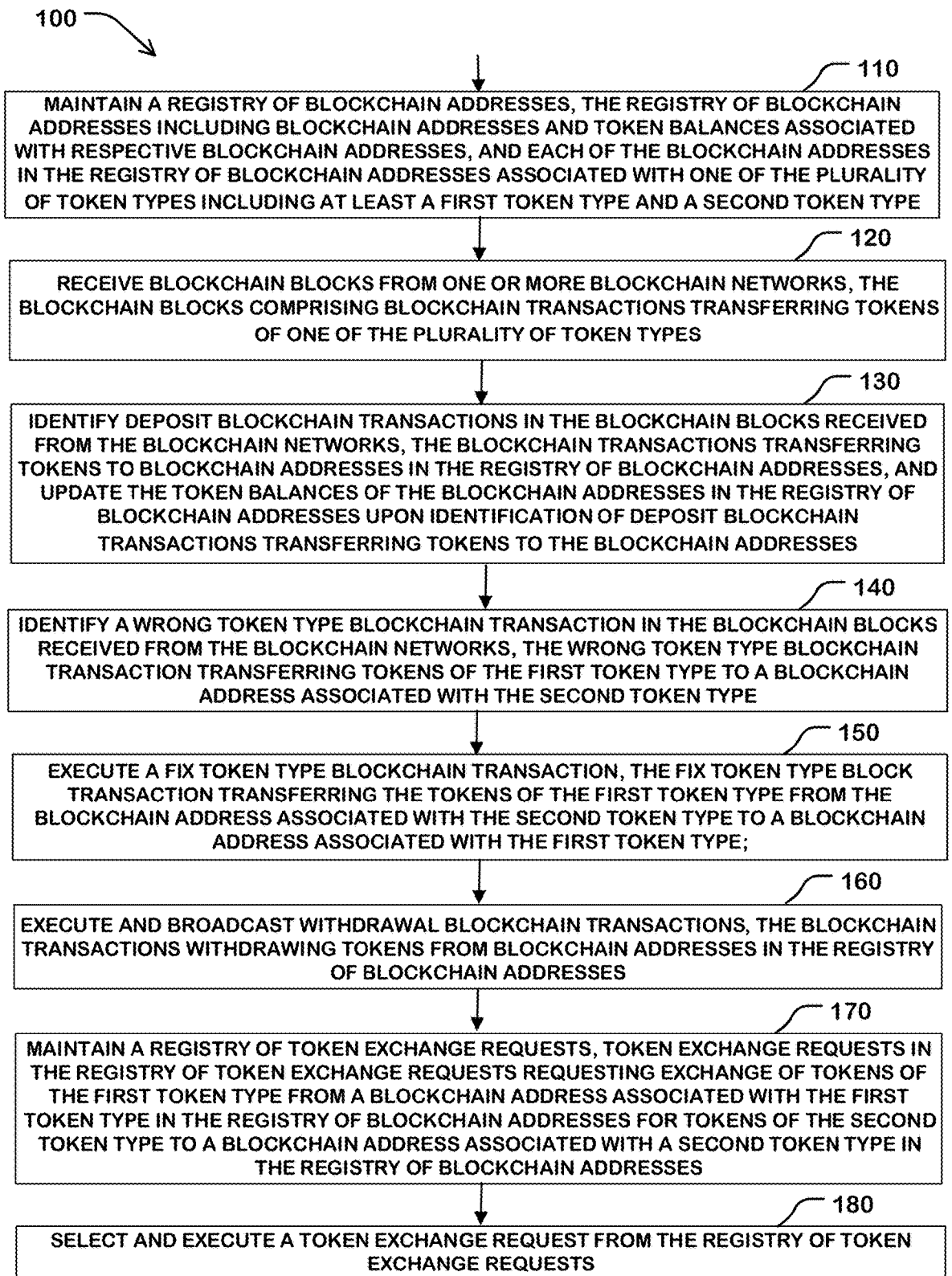
FIG. 1 illustrates an example process flow of a token exchange system in a node.

FIG. 1 illustrates an example process flow 100 of a token exchange system. The token exchange system can be implemented on a node, such as a server, coupled to one or more blockchain networks. In some embodiments, the actions in the process flow may be performed in different orders and/or with different, fewer or additional actions than those illustrated in FIG. 1. Multiple actions can be combined in some implementations.

The process flow 100 begins at step 110 where the token exchange system maintains a registry of blockchain addresses. The registry of blockchain addresses includes information for blockchain addresses of the participants of the token exchange system. A participant of the token exchange system may have one or more blockchain addresses in the registry of blockchain addresses. The registry of blockchain addresses may include blockchain addresses that can be used as source blockchain addresses and destination blockchain addresses in blockchain transactions and token exchange transactions.

In some embodiments, the blockchain address of a participant can be randomly generated using a public key associated with a private key of the participant. The public key is used to identify transactions associated with the address while the private key is used to sign the transactions. The public key/private key pair can be produced using public key cryptography. Public key cryptography uses pairs of keys: (i) public keys which may be disseminated widely, and (ii) private keys which are known only to the owner of the key. Public key cryptography accomplishes two functions: authentication, which is when the public key can be used to verify that a holder of the paired private key sent the message, and encryption, whereby only the holder of the paired private key can verify the message encrypted with the public key. In a public key cryptography system, any person can encrypt a message using the public key of the receiver, but such a message can be signed only with the receiver's private key. Private keys can be stored in desktop wallets (wallet service available on that particular machine on which the wallet service has been installed), cloud wallets (wallet service hosted by a third party), mobile wallets (any wallet that exists on a device that will connect to the internet), hardware wallets (physical devices), paper wallets (printing out the private keys on a piece of paper which will then be stored in a secure place).

In one embodiment, the private key used to produce the blockchain addresses can be generated and stored in a digital "wallet." A digital wallet is a software program that maintains blockchain addresses and private keys held by the account holders, and supports the execution of blockchain transactions by which users send or receive cryptocurrency, pay for goods or save cryptocurrency. Numerous digital wallets exist today such as Coinbase™, Bread Wallet™, Mycelium™, Exodus™, Copay™, Jaxx™, Armory™, Trezor™, Ledger Nano™, Green Address™, and Blockchain.info™.

For each blockchain address in the registry of blockchain addresses, the registry of blockchain address may include a token balance associated with the blockchain address. In some embodiments, the token balance of a blockchain address is determined by establishing the difference between the number of tokens transferred in blockchain transactions with the blockchain address as the destination blockchain address and the number of tokens transferred in blockchain transactions with the blockchain address as the source blockchain address.

Each of the blockchain addresses in the registry of blockchain addresses is associated with a token type from the plurality of token types supported by the token exchange system. The token exchange system may include multiple blockchain addresses in the registry of blockchain address for a participant of the token exchange system where each of the blockchain addresses is any one of the token types from the plurality of token types. For examples, for a token exchange system that supports token exchanges between the token types Credo™, Bitcoin™, Bitcoin Cash™, Bitcoin SV™, Bitcoin Gold™, Bitcoin Diamond™, Ethereum™, Ethereum Classic™, Ethereum20™, Litecoin™, Litecoin Cash™ and Litecoin Plus™, the registry of blockchain addresses may include a blockchain address associated with the token type Credo™, a blockchain address associated with the token type Bitcoin™, and a blockchain address associated with the token type Bitcoin Cash™ for a participant of the token exchange system.

In some embodiments, the token type associated with a blockchain address can be determined by the address format of the blockchain address. For example, a blockchain address of the token type Bitcoin™ starts with 1 or 3 and contains 27-34 alphanumeric Latin characters (except 0, O, I), a blockchain address of the token type Ethereum™ starts with '0x', and a blockchain address of the token type Bitcoin Cash™ starts with "bitcoincash:". In other embodiments, the token type associated with the blockchain address may be stored when the address is generated and may be referred to later.

In some embodiments, the registry of blockchain addresses may include private keys needed to sign transactions that claim the tokens associated with the blockchain addresses.

Referring to FIG. 1, at step 120, the token exchange system can receive blockchain blocks from one or more blockchain networks. The node hosting the token exchange system can act a miner or a non-miner in the blockchain networks from which the node is receiving the blockchain blocks. A blockchain network includes a plurality of nodes hosting copies of the blockchain. Some of the nodes in the blockchain network are miners, while the other nodes are non-miners. A miner may also be known as a staker or a validator. The miners perform the mining operations in the blockchain network as well as maintain a copy of the blockchain. Mining operations may include validating new transactions, creating new blocks in the blockchain, validating new blockchain blocks, etc. Non-miners can maintain copies of the blockchain without performing any mining operations, though they may perform a subset of operations such as partially validating blocks.

The miners in a blockchain network can actively protect the blockchain network by maintaining a consensus algorithm. The miners can construct a block of blockchain transactions, validate the blockchain transactions in the block and reach a consensus proof on the block that should be added next to the blockchain. The newly mined block is then broadcast to the entire network. While each miner on the blockchain network can create its own block, only the block which has a consensus proof is accepted to be added to the blockchain. The consensus mechanism ensures that the nodes agree on the same block to be added to the blockchain. Blockchain offers enhanced security as compared to centralized systems as every transaction is verified by multiple miners. The integrity of the transaction data recorded in the blocks is protected through strong cryptography. In addition to the transaction data, each block contains a consensus proof of itself and the consensus proof of the previous block. Any attempts to modify a transaction would result in a change in the consensus proof and would require all the subsequent blocks to be recomputed. This would be extremely difficult to achieve as long as the majority of miners do not cooperate to attack the network. Various consensus algorithms are available to miners in blockchain networks. The two main approaches are the proof-of-work algorithm (PoW) and the proof-of-stake algorithm (PoS).

Referring to FIG. 1, at step 130, the token exchange system can identify deposit blockchain transactions in the blockchain blocks received from the blockchain networks. The deposit blockchain transaction may be used to deposit tokens to blockchain addresses in the registry of blockchain addresses. The registry of blockchain addresses may aggregate tokens deposited by participants into their blockchain addresses in the registry of blockchain addresses where the aggregated token may be securely stored. To aggregate deposits of tokens, the token exchange system may receive a request to deposit an amount of token in a blockchain address through a deposit blockchain transaction where the blockchain address is the destination blockchain address. The token exchange system may use the encryption keys (i.e., public key and private key) to receive the tokens and credit the token balance associated with the blockchain address in the number of tokens received.

In some embodiments, the token exchange system may detect deposit blockchain transactions by polling the blockchains in the blockchain networks for new blocks containing deposit blockchain transactions. In some embodiments, the token exchange system may detect deposit blockchain transactions in blocks received from other nodes in the blockchain networks.

In some embodiments, the token exchange system may verify the deposit blockchain transactions before updating the token balance in the registry of blockchain addresses. The verification of the deposit blockchain transactions is done by confirming transfers of tokens to the destination blockchain addresses included in the deposit blockchain transaction. In some embodiments, the deposit blockchain transactions are verified after the blocks storing the deposit blockchain transactions reach a predetermined height in the blockchain ledger. The height of a block is the number of blocks in the blockchain between the block and the last block added to the blockchain.

Referring to FIG. 1, at step 140, the token exchange system can identify a wrong token type blockchain transaction in the blockchain blocks received from the blockchain networks. A wrong token type blockchain transaction is a blockchain transaction that transfers tokens of a first token type from the plurality of token types supported by the token exchange system to a destination blockchain address associated with the second token type. The second token type is also included in the plurality of token types supported by the token exchange system. Examples of wrong token type blockchain transaction include the transfer of tokens of the token type Bitcoin™ to a destination blockchain address of the token type Ethereum™ and transfer of tokens of the token type Bitcoin™ to a destination blockchain address of the token type Bitcoin Cash™. The token exchange system may identify the token type associated with the destination blockchain address of the wrong token type blockchain by evaluating the address format of the destination blockchain address.

In some embodiments, the token exchange system may detect wrong token type blockchain transactions by polling the blockchains in the blockchain networks for new blocks containing the wrong token type blockchain transactions. In some embodiments, the token exchange system may detect wrong token type blockchain transactions in blocks received from other nodes in the blockchain networks.

Referring to FIG. 1, at step 150, the token exchange system can compose and execute a fix token type blockchain transaction to redirect the tokens of a first token type in a detected wrong token type blockchain transaction to a destination blockchain address associated with the first token type. The destination blockchain address of the wrong token type blockchain transaction can be used as the source blockchain address of the fix token type blockchain transaction.

In some embodiments, the token exchange system may select the blockchain address associated with the first token type from the registry of blockchain addresses. The node may select the blockchain address associated with the first token type by an identifier of the blockchain address associated with the second token type with an identifier of blockchain address associated with the first token type.

Identifiers to be matched for selecting the blockchain address of the right token type can be parameters associated with blockchain addresses. The identifiers used for selection of the blockchain address of the right token type can include for example private keys needed to sign the blockchain addresses, the owner of the blockchain addresses, the address format of the blockchain addresses, token types associated with the addresses, etc. In some embodiments, the blockchain address associated with the first token type and the blockchain address associated with the second token type can be signed by a private key of a participant. In some embodiments, blockchain addresses with that can be signed by a common private key may have a common blockchain address format (i.e., both the blockchain addresses start with the same string of characters and/or have the same number of characters). The node may select the blockchain address associated with the second token type by matching the address format of the blockchain address associated with the second token type with the address format the blockchain address associated with the first token type.

The executed fix token type blockchain transaction is broadcasted to other nodes in the blockchain network from where the wrong token type blockchain transaction was identified.

Referring to FIG. 1, at step 160, the token exchange system may execute and broadcast withdrawal blockchain transactions. Participants of the token exchange system may use the tokens associated with the blockchain addresses in the registry of blockchain addresses to execute various transactions. The withdrawal blockchain transactions transfer tokens from blockchain addresses in the registry of blockchain addresses to destination blockchain addresses not included in the registry of blockchain addresses. To execute a withdrawal blockchain transaction, the token exchange system receives a request from a participant authorizing payment of a number of tokens to a destination blockchain address. The executed withdrawal blockchain transaction is broadcasted to other nodes in the blockchain networks.

Referring to FIG. 1, at step 170, the token exchange system maintains a registry of token exchange requests. Token exchange requests in the registry of token exchange requests request exchange of a number of tokens of a first token type from a blockchain address in the registry of blockchain addresses for tokens of a second token type to a blockchain address associated in the registry of blockchain addresses. In some embodiments, the token exchange system receives token exchange requests from the participants of the token exchange system and adds the received token exchange requests to the registry of token exchange requests.

In some embodiments, exchange transactions between tokens of two token types can be executed as off-chain transactions. The off-chain transaction includes linking the source blockchain address and encryption keys of the tokens to the destination blockchain address and encryption keys. An off-chain transaction is a transaction that is locally processed by the cryptocurrency service provider, for example, and not recorded on a blockchain network. The participants of the token exchange system use the token exchange system as a trusted third party to record and guarantee the transaction. While a blockchain transaction depends on the blockchain network to determine its validity, an off-chain transaction relies on other methods to record and validate the transaction, such as a payment channel implementing Hashed Timelock Contracts, Sidechains, etc. Participants requesting off-chain transaction must agree to accept the particular method by which the transaction occurs. Off-chain transactions allow for more immediate transfer of tokens between two parties, without delays or unavoidable transaction fees of validating transactions by the blockchain network. During an off-chain transaction, blockchain addresses and private/public keys associated with the transaction are linked to the recipient. In one embodiment, "linking" blockchain addresses and keys includes assigning the blockchain addresses and encryption keys to the receiver. In one embodiment, "linking" blockchain addresses and keys includes giving the receiver effective access to the blockchain addresses and encryption keys. In another embodiment, "linking" blockchain addresses and keys includes notifying the trusted third party of the reassignment of the blockchain addresses and keys to the receiver. Off-chain channels, such as Lightning Network™ and Raiden Network™, also allow off-chain transactions between various users by creating a relationship between the users and updating token balances after transactions without broadcasting to the blockchain network.

In some embodiments, a token exchange request can be classified as one of the following categories: a market order, a limit order, a market sell, and a limit sell. A market order token exchange request is a request where an amount of tokens of the second type is to be exchanged for tokens of the first type as quickly as possible at the present or market token exchange rate between the first token type and the second token type. A market sell token exchange request is a request where an amount of tokens of the first type is to be exchanged for tokens of the second type as quickly as possible at the present or market token exchange rate between the first token type and the second token type. A limit order token exchange request is a request where an amount of tokens of the second type is to be exchanged for tokens of the first type as at a minimum or maximum token exchange rate between the first token type and the second token type. A limit sell token exchange request is a request where an amount of tokens of the first type is to be exchanged for tokens of the second type as quickly at a minimum or maximum token exchange rate between the first token type and the second token type. In some embodiments, additional categories of token exchange request such as stop orders may be supported.

Referring to FIG. 1, at step 180, the token exchange system selects a token exchange request from the registry of token exchange requests, the token exchange request requesting a first number of tokens of the first token type from a first blockchain address to tokens of the second type to a second blockchain address. The token exchange executes a blockchain transaction transferring a first number of tokens of the first token type from the first blockchain address. The token exchange system determines a second number of tokens of the second token type equivalent to the first number of tokens of the first token type on dependence upon a token exchange rate of the first token type and the second token type. The token exchange system then executes a blockchain transaction transferring the second number of tokens of the second token type to the second blockchain address. Token exchange requests described in FIG. 1 may be associated with a blockchain address through a database relation.

Figure 2:
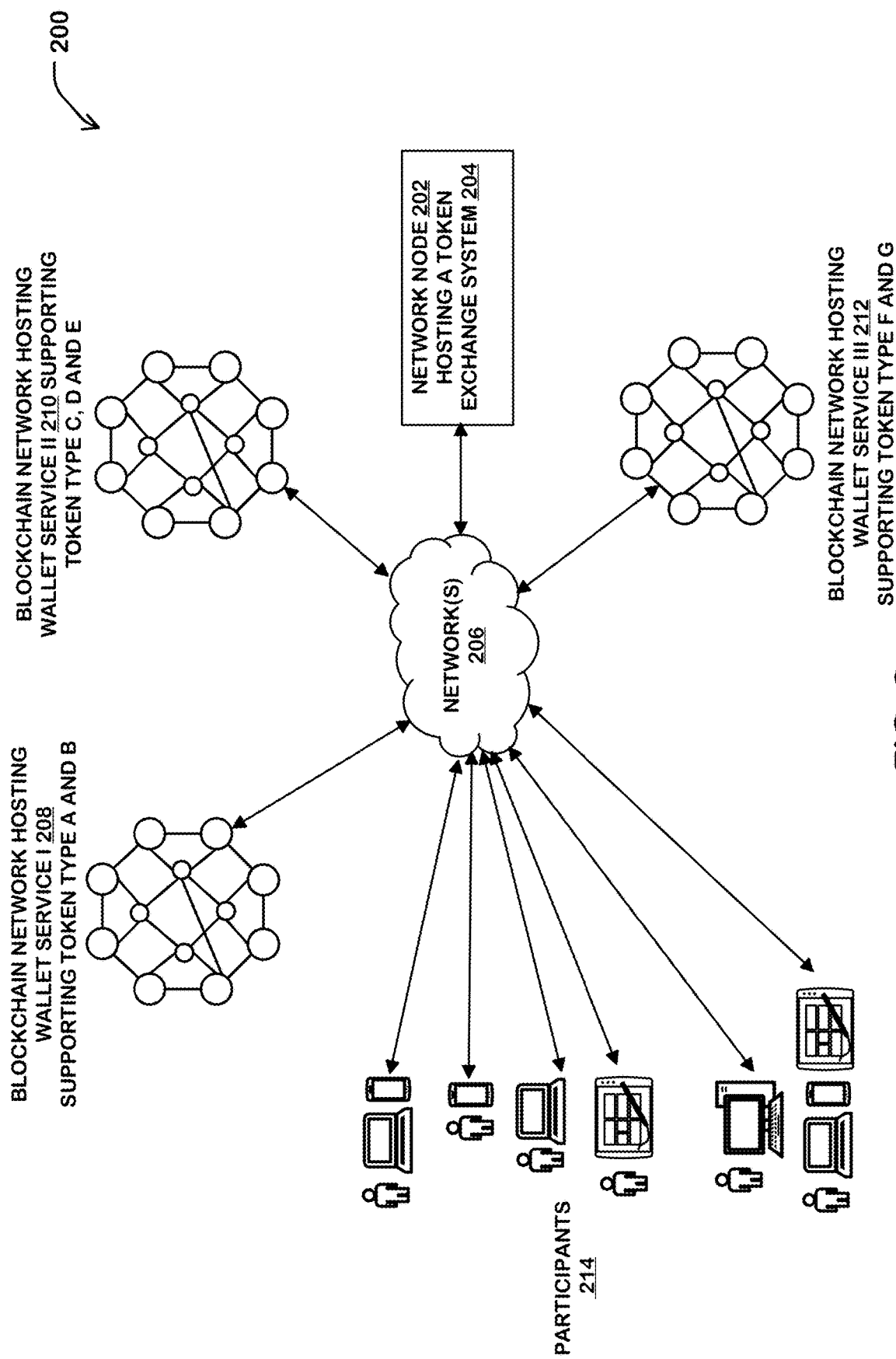
FIG. 2 illustrates an architectural level schematic of an environment that includes a token exchange system in accordance with an implementation.

The processes of FIG. 1 and/or FIG. 2 can be implemented using a computer system storing computer software for execution which has access to one or more blockchain networks. The network node can be implemented on a machine coupled to the Internet including, and in other embodiments, a cloud-based server, and in other embodiments, any point of presence on a network connected to the Internet.

The computer software implementing the process of FIG. 1 and/or FIG. 2 can be stored in computer-readable memory, or other non-transitory data storage medium, for the purposes of distribution to machines to execute the procedures, or for access by a processor or processors executing the procedure.

System Overview

FIG. 2 illustrates an architectural level schematic of an environment in which a token exchange system executing procedures like that of FIG. 1 is deployed in a network node 202 on the network 206. As FIG. 2 is an architectural diagram, certain details are intentionally omitted to improve the clarity of the description. The discussion of FIG. 2 will be organized as follows. First, the elements of the figure will be described, followed by their interconnections.

The system 200 includes the network(s) 206, a blockchain network 208 hosting the wallet service I and supporting transactions of the token types A and B, a blockchain network 210 hosting the wallet service II and supporting transactions of the token types C, D and E, a blockchain network 212 hosting the wallet service III and supporting transactions of the token types F and G, and a network node 202 hosting a token exchange system 204.

Participants 214 are connected to the network node 202 hosting the token exchange system 204 through the network 206. In some embodiments, participants 214 may include one or more individuals who utilize the functionality of a token exchange system. Participants 214 can interact with the token exchange system 204 through many devices including in some examples the following devices: a smartphone, a personal computing (PC) device such as a desktop or laptop computer, a media center device or other PC derivative, portable media consumption device (mobile terminal, personal digital assistant (PDA), gaming and/or media console, etc.), a tablet computer, other consumer electronic device, or the like.

As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three blockchain networks are shown to be connected to the network node 202 hosting a token exchange system 204 through the network(s) 206. However, any number of blockchain networks can be connected to the network node 202 hosting the token exchange system 204 through the network(s) 206.

The interconnection of the elements of system 200 will now be described. Network(s) 206 couples the electronic devices of the participants 214, the blockchain network 208 hosting the wallet service I and supporting transactions of the token types A and B, the blockchain network 210 hosting the wallet service II and supporting transactions of the token types C, D and E, the blockchain network 212 hosting the wallet service III and supporting transactions of the token types F and G, and the network node 202 hosting the token exchange system 204, all in communication with each other (indicated by solid double-arrowed lines).

The actual communication path through the Internet can be point-to-point over public and/or private networks. The communications can occur over a variety of network(s) 206, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, 5G and WiMAX. Additionally, a variety of authorization and authentication techniques, such as username/password, Open Authorization (OAuth), Kerberos, SecureID, digital certificates and more, can be used to secure the communications.

The blockchain networks 208, 210 and 212 are distributed and public ledgers which maintain records of all the blockchain transactions on the blockchain. In some embodiments. The blockchain networks 208, 210 and 212 host wallet services that support one or more token types. Examples of popular blockchain platforms include Ethereum™, Eris™, Multichain™, Bitcoin™, Hyperledger Fabric™, and Hyperledger Corda™. Participants 214 can maintain a cryptocurrency balance and send or receive cryptocurrency through the wallet services hosted by the blockchain networks 208, 210 and 212. In some embodiments, the network node 202 hosts a token exchange system 204 may act as a miner in the blockchain networks 208, 210 and/or 212. In some embodiments, the network node 202 hosts a token exchange system 204 may act as a non-miner in the blockchain networks 208, 210 and/or 212.

Token Exchange System

Figure 3:
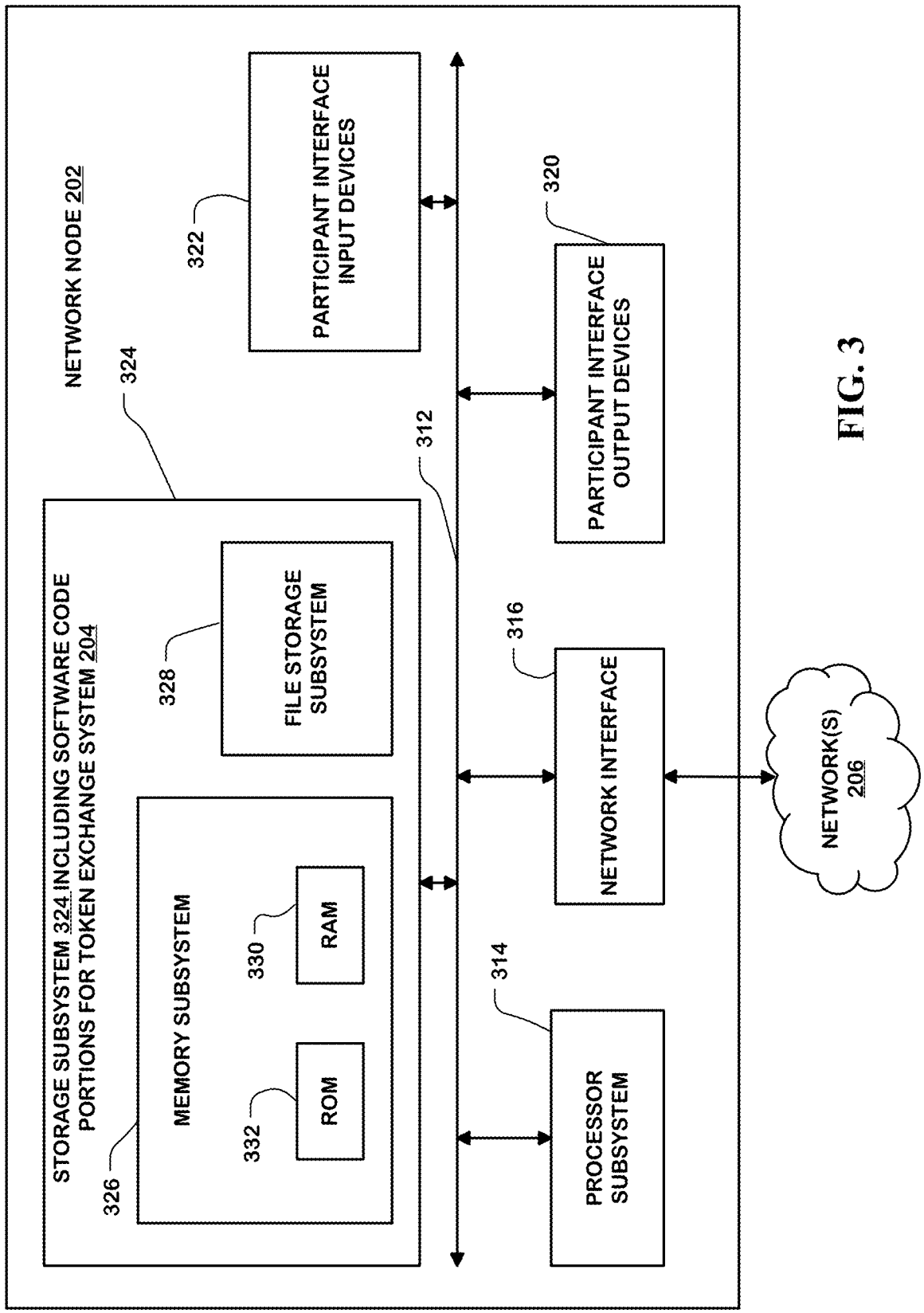
FIG. 3 is a simplified block diagram of a node hosting a token exchange system.

The network node 202 hosts a token exchange system 204. FIG. 3 is a simplified block diagram of a network node 202 that can be used to implement the token exchange system 204. The network node 202 typically includes an operating system executed by a processor subsystem 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with network node 202. Network interface subsystem 316 provides an interface to outside network 318 and is coupled via network 206 to other elements in system 200. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 322 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 202 or onto the network 206.

User interface output devices 320 may include a display subsystem, a printer, a fax machine, or nonvisual displays such as audio output devices. The display subsystem may include a cathode ray tube (CRT), a flat-panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 202 to the user or to another machine or network node. In particular, an output device of the network node 202 on which the token exchange system 204 is implemented, may include a visual output informing a user of action recommendations made by the system, or may include a communication device for communicating action signals.

Storage subsystem 324 stores the basic programming and data constructs that provide the functionality of certain embodiments of the present invention. For example, the various modules implementing the functionality of certain embodiments of the invention may be stored in storage subsystem 324. These software modules are generally executed by processor subsystem 314.

Memory subsystem 326 typically includes a number of memories including a main random access memory (RAM) 330 for storage of instructions and data during program execution and a read-only memory (ROM) 332 in which fixed instructions are stored. File storage subsystem 328 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 328. The host memory subsystem 326 contains, among other things, computer instructions which, when executed by the processor subsystem 314, cause the computer system to operate or perform functions as described herein. As used herein, processes and software that are said to run in or on "the host", "the computer" or "the network", execute on the processor subsystem 314 in response to computer instructions and data in the host memory subsystem 326 including any other local or remote storage for such instructions and data.

Bus subsystem 312 provides a mechanism for letting the various components and subsystems of network node 302 communicate with each other as intended. Although bus subsystem 312 is shown schematically as a single bus, alternative embodiments of the bus subsystem may use multiple busses.

The network node 202 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of network node 202 depicted in FIG. 3 is intended only as a specific example for purposes of illustrating the preferred embodiments of the present invention. Many other configurations of network node 202 are possible having more or less components than the system depicted in FIG. 3.

In some embodiments, the token exchange system 204 can be implemented in the network node 202 as a Software-as-a-Service (SaaS) application, a web-architected application or a cloud-delivered service. Examples of common SaaS applications today include Salesforce.com™, Box™, Dropbox™, Google Apps™, Amazon Web Services AWS™, Microsoft Office365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces).

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Figure 4:
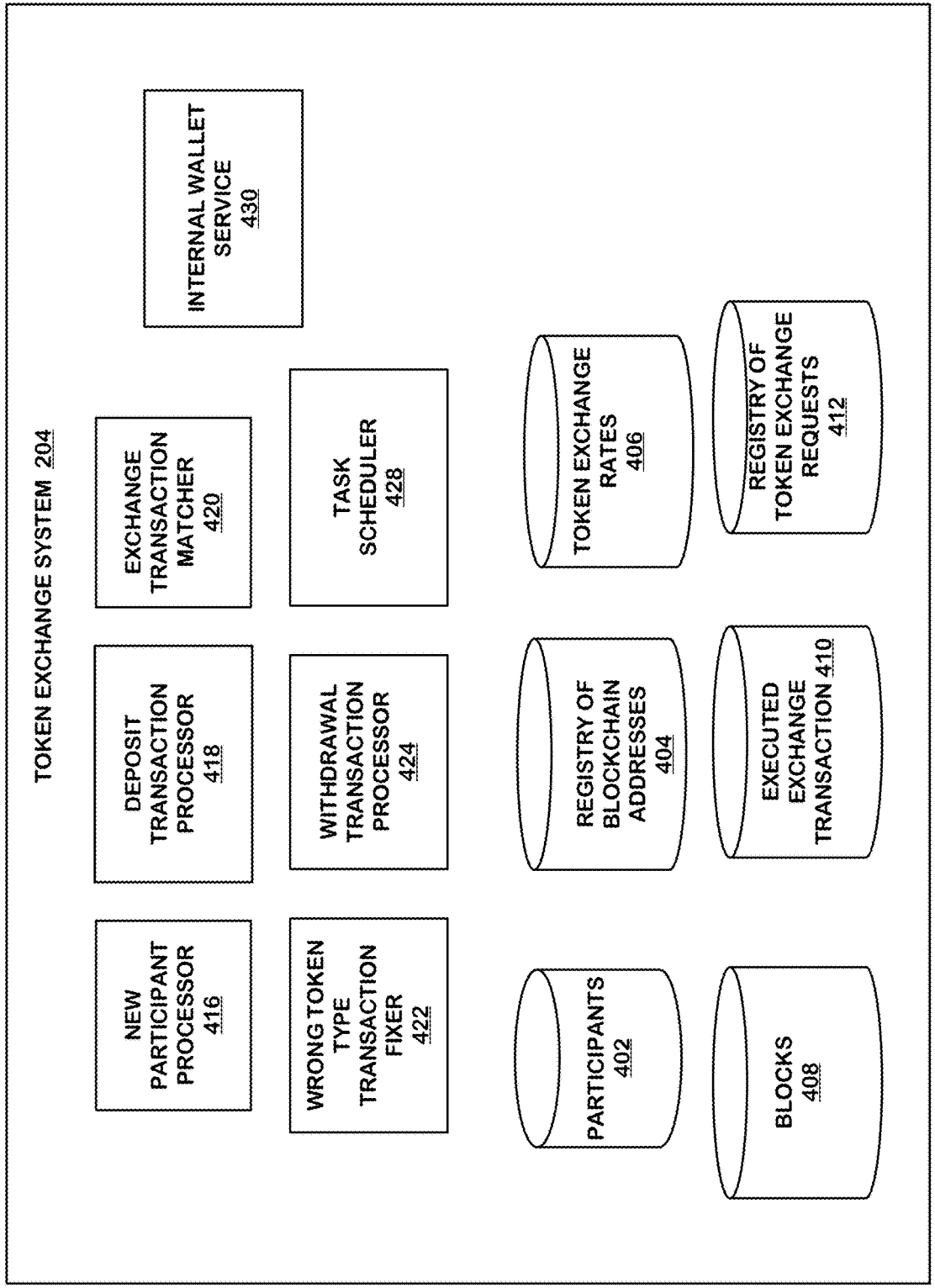
FIG. 4 illustrates an example of a token exchange system.

FIG. 4 illustrates an example of a token exchange system 204. The token exchange system 204 includes software components referred to herein as a new participant processor 416, a deposit transaction processor 418, an exchange transaction matcher 420, a wrong token type transaction fixer 422, a withdrawal transaction processor 424 and a task scheduler 428. These components can be distributed between nodes executing email servers and remote nodes in the network in some embodiments.

The new participant processor 416 processes the sign-up process for registration of new token exchange system users in the system. The deposit transaction processor 418 identifies deposit blockchain transactions in the blockchain blocks received from the blockchain networks 208, 210 and/or 212, and update the token balances of the blockchain addresses in the registry of blockchain addresses upon identification of deposit blockchain transactions transferring tokens to the blockchain addresses. The exchange transaction matcher 420 selects token exchange requests from a registry of token exchange requests and executes the exchange transactions for the token exchange requests. The wrong token type transaction fixer 422 identifies wrong token type blockchain transactions in the blockchain blocks received from the blockchain networks 208, 210 and/or 212, and executes fix token type blockchain transactions to remedy the identified wrong token type blockchain transaction. The withdrawal transaction processor 424 executes and broadcasts withdrawal blockchain transactions. The task scheduler 428 schedules various tasks in the token exchange system 304, such as requesting the deposit transaction processor 418 to check for new deposit blockchain transactions in new blockchain blocks received from the blockchain networks 208, 210 and/or 212, requesting the exchange transaction matcher 420 to process new token exchange requests, and requesting the wrong token type transaction fixer 422 to check for new wrong token type blockchain transactions in new blockchain blocks received from the blockchain networks 208, 210 and/or 212. In some embodiments, the token exchange system 204 may also host an internal wallet service 430 for participants of the token exchange system 204 who wish to store their cryptocurrency balance using the token exchange system 204.

The token exchange system 204 also includes a participants database 402, a registry of blockchain addresses 404, a token exchange rates database 406, blocks 408, an executed exchange transaction database 410 and a registry of token exchange requests 412 storing token exchange requests. As used herein, the term "database" does not necessarily imply any unity of structure. For example, two or more separate databases, when considered together, still constitute a "database" as that term is used herein. Databases can include tables. In some embodiments, the user and registered email account data are stored in separate tables within a single database.

FIG. 5 is a symbolic drawing indicating how the participants database 402 in FIG. 4 is organized, according to an embodiment of the invention. The participants database 402 contains information regarding the participants of the token exchange system. The participants database 402 includes a unique user ID 502 for each participant and the name of the participant 504. In some embodiments, the participants database 402 can have separate entries for the first name and surname of the participant. As shown in FIG. 5, some example entries include participant John E. Murphy with user ID 1001 and participant Kristine B. Odaniel with user ID 1004. In some embodiments, the participants database 402 may include other optional participant information 506 that might be helpful for the functionality of the token exchange system 204, e.g., the password for the participant account, the timestamp of last sign in, the timestamp for participant account creation, participant organization, profile picture, and so on.

FIG. 6 is a symbolic drawing indicating how a database for the registry of blockchain addresses 404 in FIG. 4 is organized, according to an embodiment of the invention. The registry of blockchain addresses 404 contains information regarding the blockchain addresses of the participants of the token exchange system that can be used to exchange tokens of different token types. Tokens can be deposited to and withdrawn from the blockchain addresses in the registry of blockchain addresses 404. The registry of blockchain addresses 404 includes a user ID 502 for each blockchain address in the registry. The owner of the blockchain address is identified by the user ID 502 of the owner. The registry of blockchain addresses 404 further includes a blockchain address 608 associated with the participant with the user ID 502, and a token type 606 supported by the blockchain address 608. In some embodiments, the registry of blockchain addresses 404 can include the private keys needed to sign transactions sent from the blockchain address 608. The registry of blockchain addresses 404 also maintains a token balance for each blockchain address.

In some embodiments, a participant may have information for two or more blockchain addresses, e.g., user John E. Murphy with user ID 1001 with a blockchain address of the token type A with a token balance of 100 tokens of token type A, a blockchain address of the token type C with a token balance of 2000 tokens of token type B, a blockchain address of the token type C with a token balance of 617 tokens of token type C, a blockchain address of the token type D with a token balance of 890 tokens of token type D and a blockchain address of the token type F with a token balance of 10000 tokens of token type F.

In some embodiments, the registry of blockchain addresses 404 may further include other optional information 612 that might be helpful for the functionality of the token exchange system 204, e.g., the timestamp for account creation, the last time account was updated and so on.

FIG. 7 is a symbolic drawing indicating how the database including the registry of token exchange requests 412 in FIG. 4 is organized, according to an embodiment of the invention. The registry of token exchange requests 412 contains information regarding token exchange requests requested by the participants of the token exchange system. The registry of token exchange requests 412 includes a user ID 502 of the participant requesting the token exchange and a request ID 702. The registry of token exchange requests 412 further includes a source blockchain address 706 and the token type associated with the source blockchain address 710, and a destination blockchain address 708 and the token type associated with the destination blockchain address 712. Both the source blockchain address and the destination blockchain address are associated with the participant with the user ID 502. A token exchange request requests an exchange of a number of tokens from the source blockchain address with a number of tokens from the destination blockchain address.

In some embodiments, the registry of token exchange requests 412 also includes the category 704 of the exchange, for example, whether the exchange would be a market order, a market sell, a limit sell and a limit order. A market order token exchange request is a request where an amount of tokens of the second type is to be exchanged for tokens of the first type as quickly as possible at the present or market token exchange rate between the first token type and the second token type. A market sell token exchange request is a request where an amount of tokens of the first type is to be exchanged for tokens of the second type as quickly as possible at the present or market token exchange rate between the first token type and the second token type. A limit order token exchange request is a request where an amount of tokens of the second type is to be exchanged for tokens of the first type as at a minimum or maximum token exchange rate between the first token type and the second token type. A limit sell token exchange request is a request where an amount of tokens of the first type is to be exchanged for tokens of the second type as quickly at a minimum or maximum token exchange rate between the first token type and the second token type.

In some embodiments, the registry of token exchange requests 412 may further include other optional information 716 that might be helpful for the functionality of the token exchange system 204, e.g., the timestamp for the creation of the token exchange request, the minimum or maximum token exchange rate for limit sell and order and so on.

The token exchange rates database 406 includes market exchange rates of the plurality of token types supported by the token exchange system 204. In some embodiments may be retrieved from services such as CryptoCompare™, CoinMarketCap™ and BitInfoCharts™.

Figure 8:
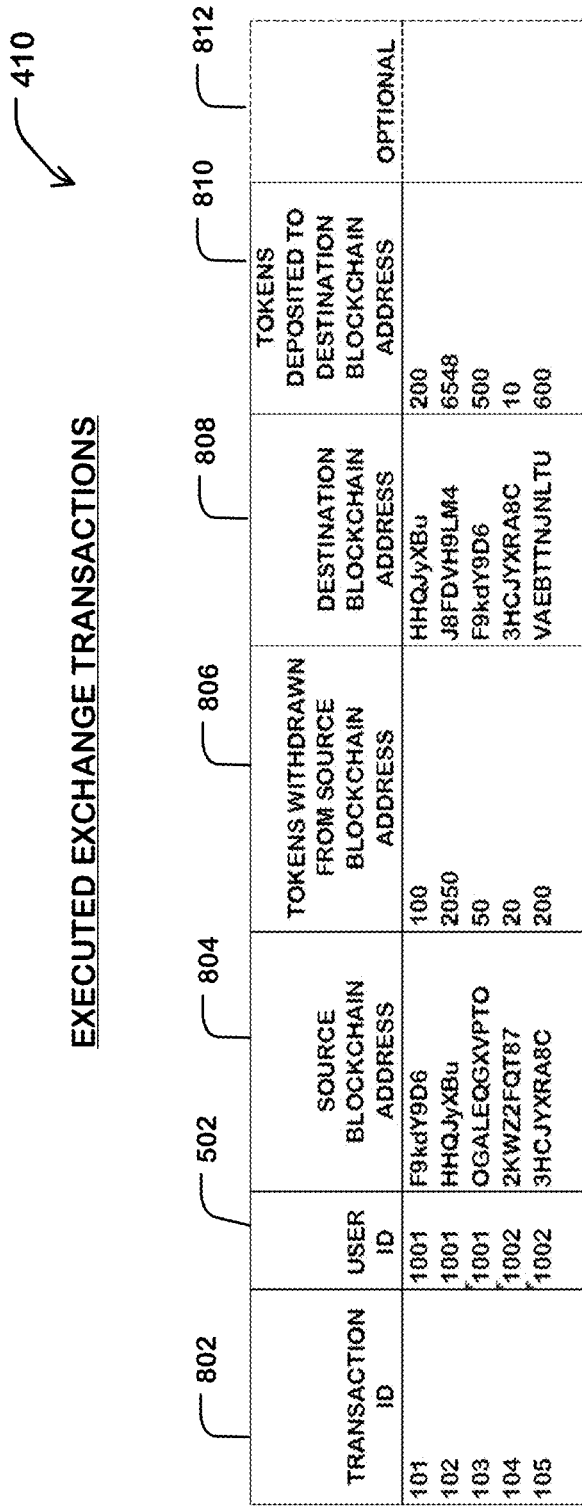
FIG. 8 is a symbolic drawing indicating how the executed exchange blockchain transactions database in FIG. 4 is organized, according to an embodiment of the invention.

FIG. 8 is a symbolic drawing indicating how the executed exchange transactions database 410 in FIG. 4 is organized, according to an embodiment of the invention. The executed exchange transactions database 410 contains information regarding executed token exchange requests requested by the participants of the token exchange system. The executed exchange transactions database 410 includes a user ID 502 of the participant who requested the token exchange and a transaction ID 802. The executed exchange transactions database 410 further includes a source blockchain address 804, a destination blockchain address 808, and the number of tokens 806 withdrawn from the source blockchain address 806 and the number of tokens 810 deposited to the destination blockchain address 808. In some embodiments, the executed exchange transactions database 410 may further include other optional information 812 that might be helpful for the functionality of the token exchange system 204, e.g., the timestamp for completion of the token exchange request, the exchange rate used and so on.

Blockchain Network

Figure 9A:
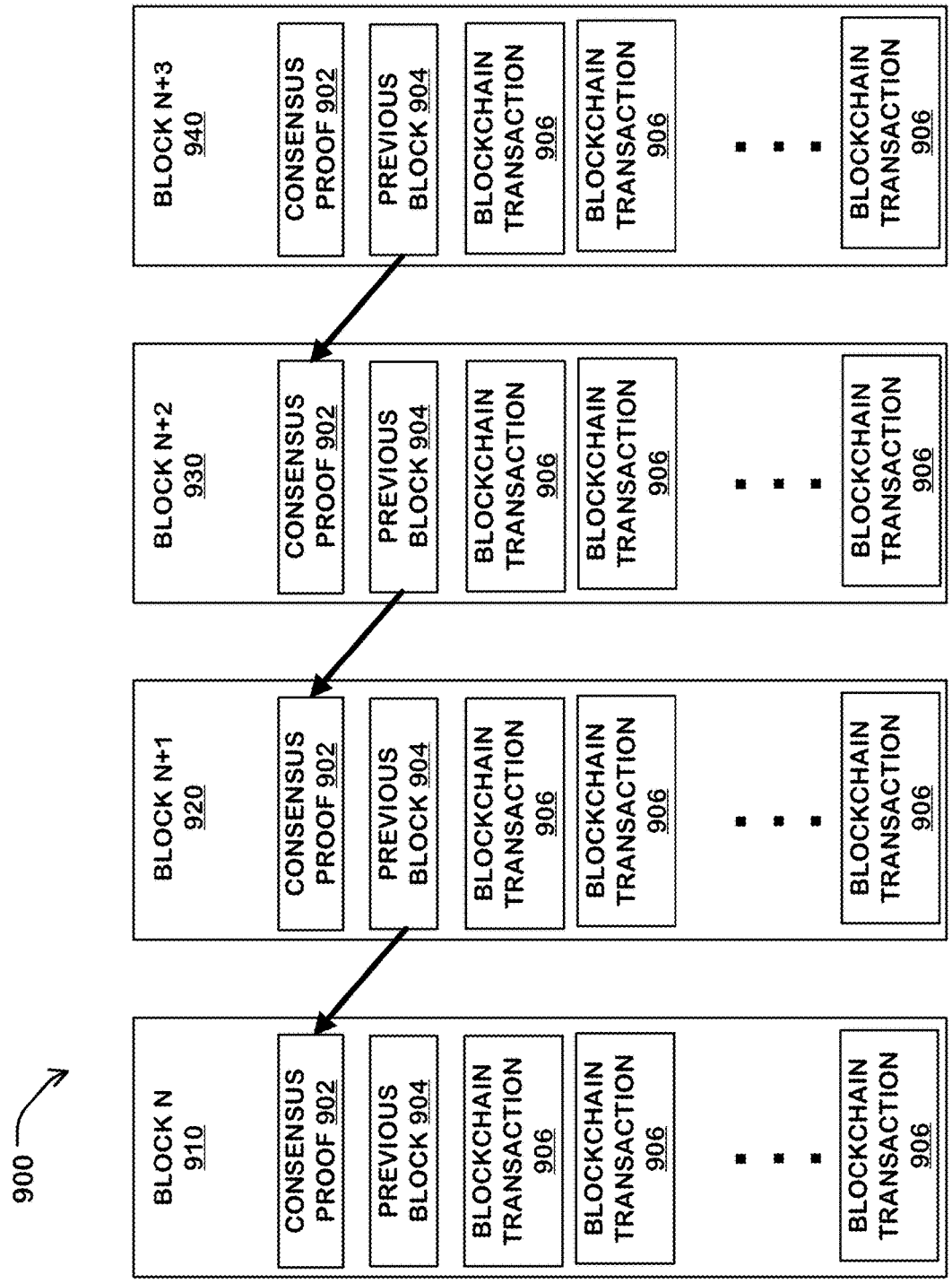

The token exchange system 204 maintains copies of the blockchains from the various blockchain networks 208, 210 and/or 212 in the blocks 408 in FIG. 4. A blockchain in any of the blockchain networks 208, 210 and/or 212 includes one or more distributed blockchain ledger data structures comprising a chain of blocks or "blockchain." This blockchain ledger data structure is replicated among the nodes in the blockchain networks. FIG. 9A illustrates a segment of such a blockchain ledger data structure 900, consisting of blocks 910, 920, 930 and 940. For the sake of clarity, only four blocks are included in FIG. 9A. Any number of blocks can be present in a blockchain structure.

Blockchain transactions 906 are time-stamped and bundled into blocks where each block is identified by its cryptographic hash called the consensus proof 902. The consensus proof can be determined by performing complex cryptographic computations with a consensus algorithm. One skilled in the art would appreciate that, in an implementation, the consensus proof can be determined by any consensus algorithm.

The blocks 910, 920, 930, 940 form a sequence where each block references the consensus proof of the previous or parent block 904, forming a chain of blocks. In some embodiments, a special data structure called a Merkle tree is used to store the blockchain transactions.

Blockchain is a mutation-resistant and durable data structure which maintains records of the blockchain transactions that are tamper-resistant. Once a blockchain transaction is recorded in a block, it cannot be altered or deleted as long as a majority of the computational or voting power of the network is not controlled by peers who collude to alter the blockchain. In addition to the transaction data, each block contains a consensus proof of itself and the consensus proof of the previous block. Any attempts to modify a transaction would result in a change in the consensus proof and would require all the subsequent blocks to be recomputed. This would be extremely difficult to achieve as long as the majority of miners do not cooperate to attack the network.

FIG. 9B illustrates an example blockchain transaction 950 that implements the technology disclosed. The blockchain transaction 950 includes a source blockchain address 952 and a destination blockchain address 954 associated with the blockchain transaction, a timestamp 956 to record the time and date the blockchain transaction was completed, and the amount and type of tokens transferred 958. The blockchain transaction 950 can also include other components which are not shown in FIG. 9B, such as header, nonce, balance, storage root, code hash, value, signature, ommers hash, beneficiary, state root, transactions root, receipts root, logs bloom, difficulty, number, private key, public key, extra data, and mix hash. One skilled in the art would appreciate that, in other implementations, the blockchain transaction 950 shown in FIG. 9B can be distributed across multiple blockchain ledgers in blockchain nodes in a blockchain network.

Processing a New Participant in the Token Exchange System

FIG. 10 is an example workflow 1000 illustrating a representative method of registering a new participant by the new participant processor 416 in the token exchange system 204. In some embodiments, the actions in the workflow may be performed in different orders and with different, fewer or additional actions than those illustrated in FIG. 10. Multiple actions can be combined in some implementations.

FIG. 10 includes workflow 1000 that begins at step S10.1 where a new participant 1002 signs up as a participant in the token exchange system 204. Workflow 1000 continues at step S10.2 where the new participant processor 416 adds information about the participant 1002 to the participants database 402. At step S10.3, the new participant 1002 provides information about his/her account or blockchain addresses in the wallet service I hosted in the blockchain network 208 to the new participant processor 416. At step S10.4, the new participant processor 416 retrieves information about the participant's blockchain addresses from the wallet service I hosted in the blockchain network 208 and saves the retrieved information in the registry of blockchain addresses 404 at step S10.5. Workflow 1000 continues at step S10.6 where the new participant 1002 provides information about his/her account or blockchain addresses in the wallet service II hosted in the blockchain network 210 to the new participant processor 416. At step S10.7, the new participant processor 416 retrieves information about the participant's blockchain addresses from the wallet service II hosted in the blockchain network 210 and saves the retrieved information in the registry of blockchain addresses 404. The participant may provide information about his/or account in more wallet services to the new participant processor 416.

Processing a Deposit Blockchain Transaction in the Token Exchange System

Figure 11:
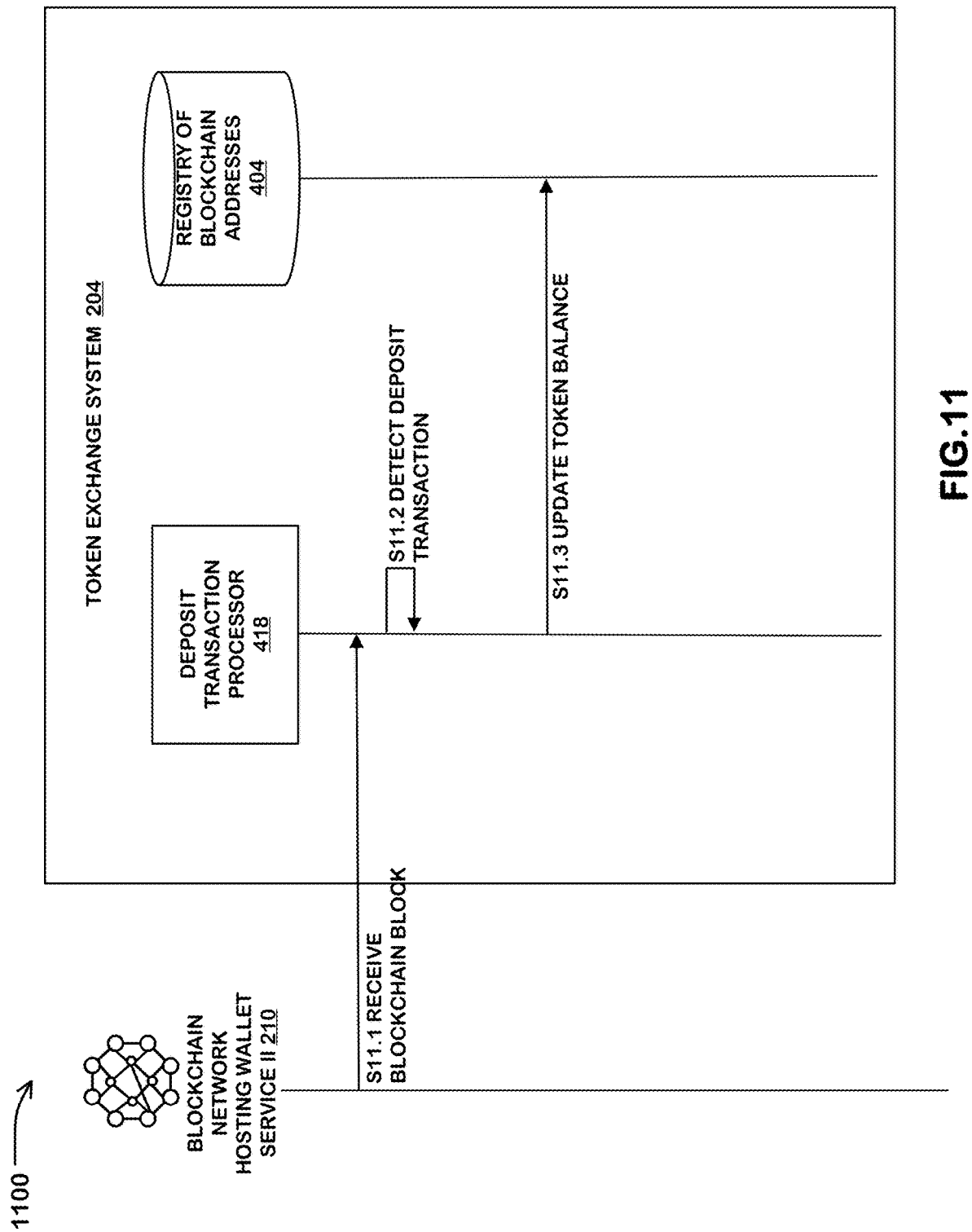
FIG. 11 is a sequence diagram illustrating a representative method of processing a deposit blockchain transaction in the token exchange system by the deposit transaction processor in FIG. 4.

FIG. 11 is a sequence diagram illustrating a representative method of processing a deposit blockchain transaction in the token exchange system by the deposit transaction processor 218 in the token exchange system 204. In some embodiments, the actions in the workflow may be performed in different orders and with different, fewer or additional actions than those illustrated in FIG. 11. Multiple actions can be combined in some implementations.

FIG. 11 includes workflow 1100 that begins at step S11.1 when the deposit transaction processor 218 receives a blockchain block from another node in the blockchain network 210. The deposit transaction processor 218 checks the received blockchain block for deposit blockchain transactions where the destination blockchain addresses for the deposit blockchain transactions are included in the registry of blockchain addresses 404. At step S11.2, deposit transaction processor 218 detects a deposit blockchain transaction. At step S11.3, the deposit transaction processor 218 updates the token balance of the destination blockchain address included in the detected deposit blockchain transaction in the registry of blockchain addresses 404.

Processing a Wrong Token Blockchain Transaction in the Token Exchange System

Figure 12:
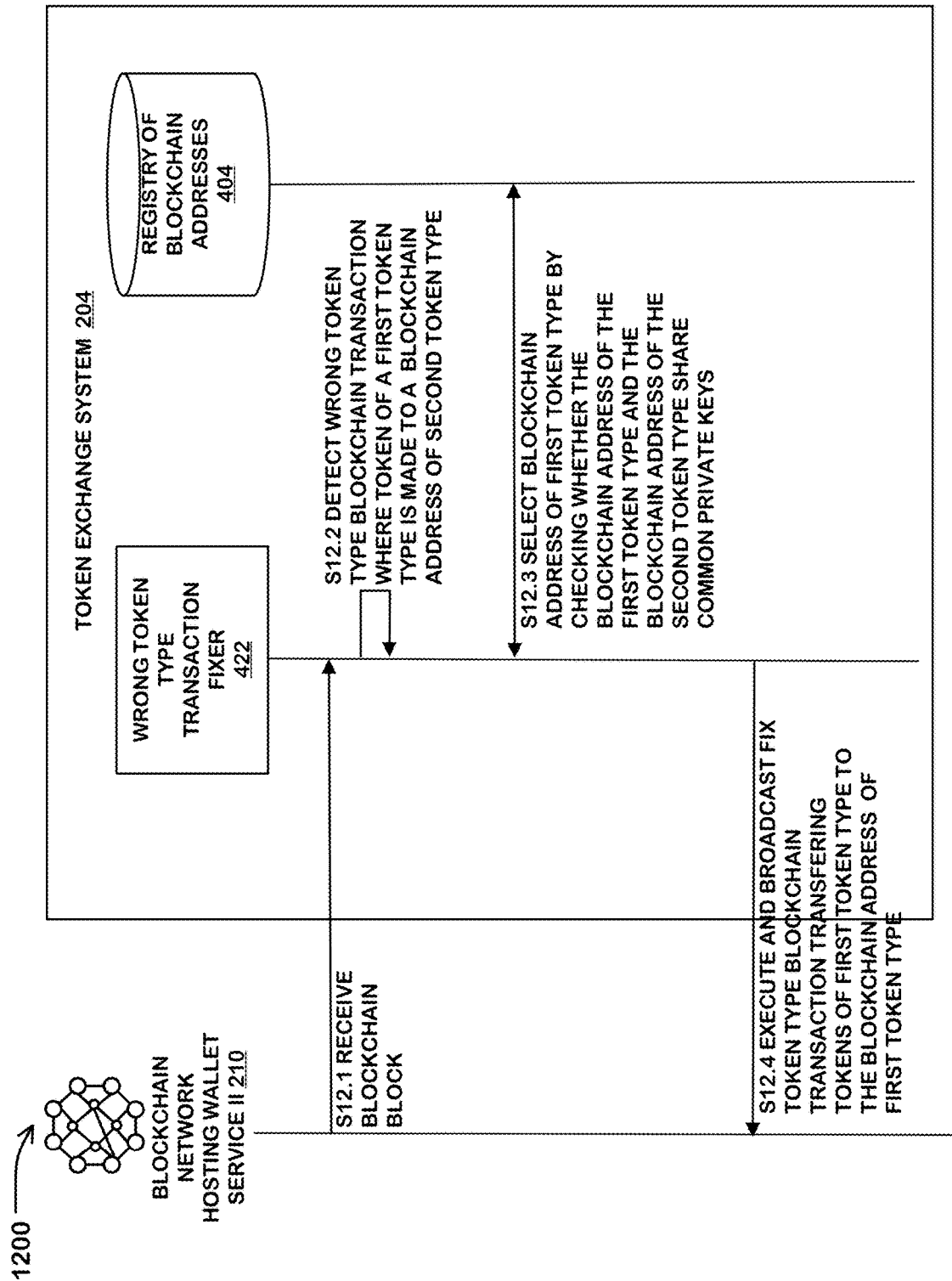
FIG. 12 is a sequence diagram illustrating a representative method of fixing a wrong token type blockchain transaction in the token exchange system by the transaction fixer in FIG. 4.

FIG. 12 is a sequence diagram illustrating a representative method of fixing a wrong token type blockchain transaction in the token exchange system 204 by the wrong token type transaction fixer 422 in FIG. 4. In some embodiments, the actions in the workflow may be performed in different orders and with different, fewer or additional actions than those illustrated in FIG. 12. Multiple actions can be combined in some implementations.

FIG. 12 includes workflow 1200 that begins at step S12.1 when the wrong token type transaction fixer 422 receives a blockchain block from another node in the blockchain network 210. The wrong token type transaction fixer 422 checks the received blockchain block for wrong type blockchain transactions. At step S12.2, the wrong token type transaction fixer 422 detects a wrong token type blockchain transaction transfers tokens of a first token type to a destination blockchain address associated with a second token type. Examples of wrong token type blockchain transaction include the transfer of tokens of the token type Bitcoin™ to a destination blockchain address of the token type Ethereum™ and transfer of tokens of the token type Bitcoin™ to a destination blockchain address of the token type Bitcoin Cash™. In some embodiments, the wrong token type transaction fixer 422 may identify the token type associated with the destination blockchain address of the wrong token type blockchain by evaluating the address format of the destination blockchain address.

At step S11.3, the wrong token type transaction fixer 422 selects a blockchain address of the second token type from the registry of blockchain addresses 404. The wrong token type transaction fixer 422 selects the blockchain address associated with the first token type such that the blockchain address associated with the first token type and the blockchain address associated with the second token type have a common private key (i.e., both the blockchain addresses can be signed by a private key of a participant), such as blockchain addresses for the token types Bitcoin™ and Bitcoin Cash™. In some embodiments, blockchain addresses with a common private key may have a common blockchain address format (i.e., both the blockchain addresses start with the same string of characters and/or have the same number of characters).

At step S11.3, the wrong token type transaction fixer 422 executes a fix token type blockchain transaction to redirect the tokens of a first token type to the blockchain address associated with the first token type selected at step S11.3. The destination blockchain address of the wrong token type blockchain transaction is used as the source blockchain address of the fix token type transaction. The blockchain address associated with the first token type selected at step S11.3 is used as the destination blockchain address of the fix token type transaction. The fix token type blockchain transaction is then broadcasted to the blockchain network 210.

Processing a Token Exchange Request in the Token Exchange System

Figure 13:
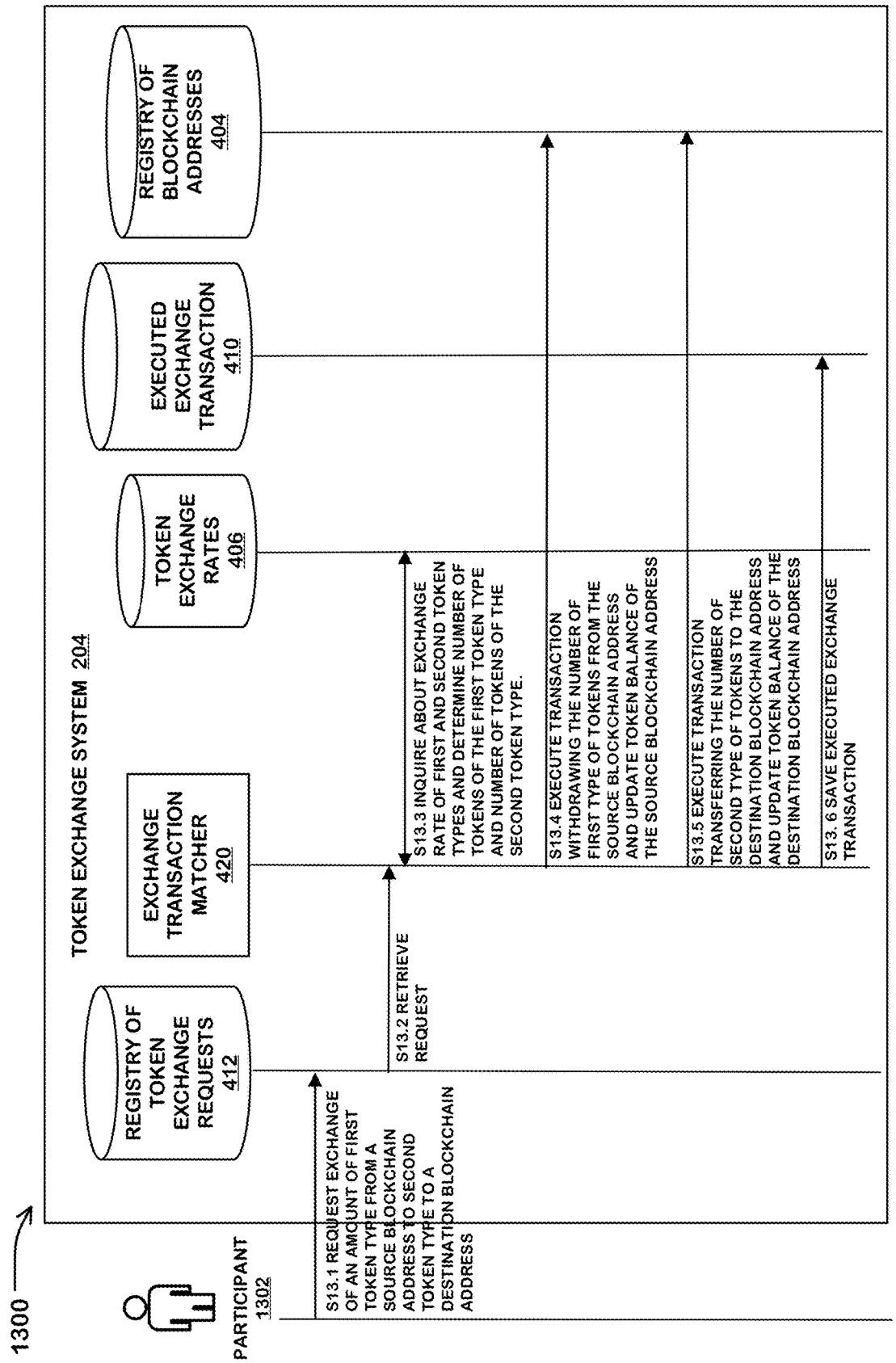
FIG. 13 is a sequence diagram illustrating a representative method of processing a token exchange request in the token exchange system by the exchange transaction matcher in FIG. 4.

FIG. 13 is a sequence diagram illustrating a representative method of processing a token exchange request in the token exchange system 204 by the exchange transaction matcher 420 in FIG. 4. In some embodiments, the actions in the workflow may be performed in different orders and with different, fewer or additional actions than those illustrated in FIG. 13. Multiple actions can be combined in some implementations.

FIG. 13 includes workflow 1300 that begins at step S13.1 when a participant 1302 of the token exchange system 204 requests an exchange of an amount of first token type from a source blockchain address to tokens of a second token type to a destination blockchain. The token exchange request is added to the registry of token exchange requests 412. At step S13.2, the exchange transaction matcher 420 selects the token exchange request from the registry of token exchange requests. At step S13.3, the exchange transaction matcher 420 inquires about the exchange rate of first and second token types from the token exchange rate database 406 and determines the number of tokens of the first token type and the number of tokens of the second token type needed for the exchange token transaction. At step S13.4, the exchange transaction matcher 420 executes a transaction transferring a first number of tokens of the first token type from the source blockchain address. At step S13.5, the exchange transaction matcher 420 executes a blockchain transaction transferring the second number of tokens of the second token type to the destination blockchain address. At step S13.6, the exchange transaction matcher 420 saves the exchange transaction in the executed exchange transaction database 410.

Processing a Withdrawal Blockchain Transaction in the Token Exchange System

Figure 14:
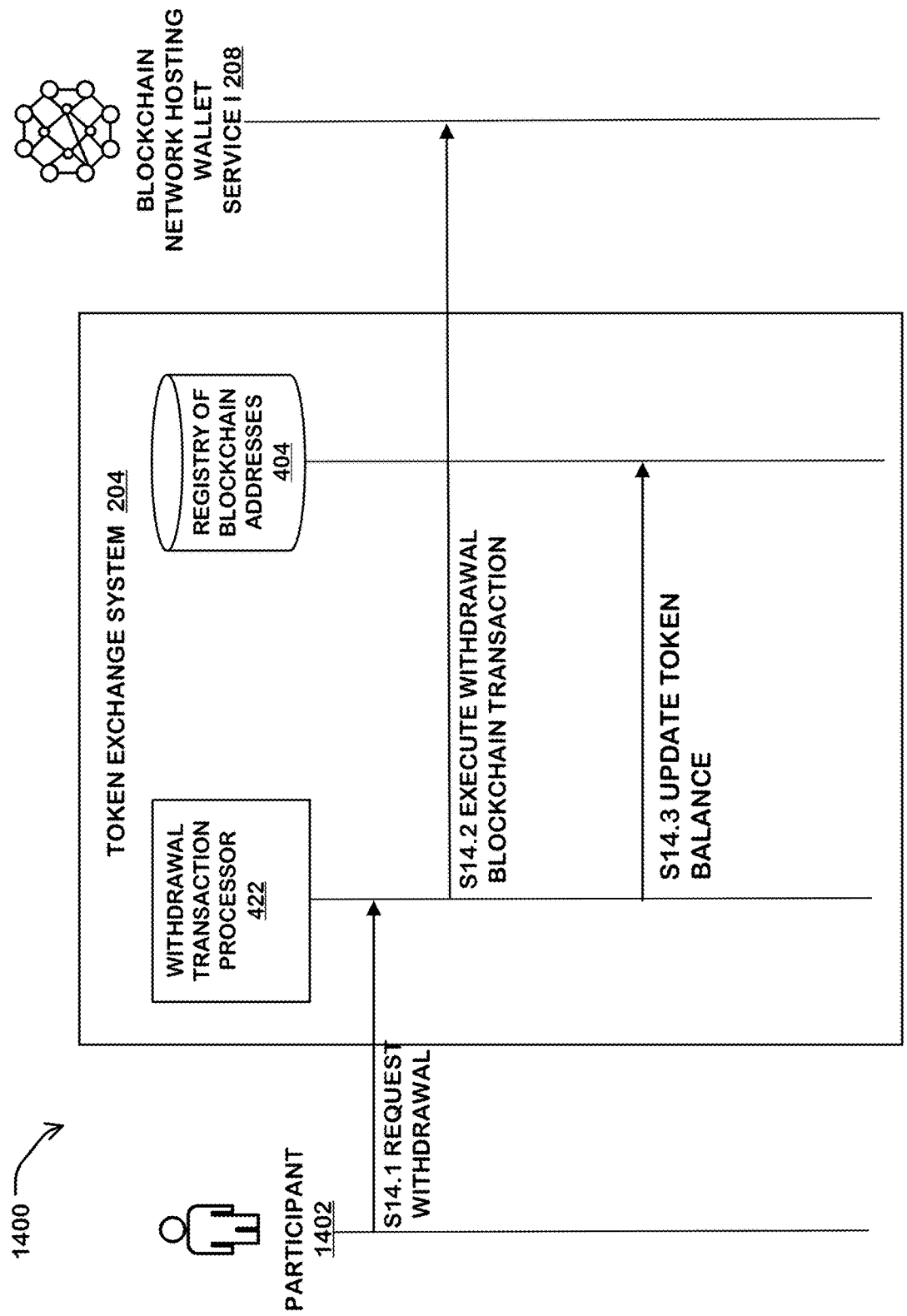
FIG. 14 is a sequence diagram illustrating a representative method of processing a withdrawal blockchain transaction in the token exchange system by the withdrawal transaction processor in FIG. 4.

FIG. 14 is a sequence diagram illustrating a representative method of processing a withdrawal blockchain transaction in the token exchange system 204 by the withdrawal transaction processor 424 in FIG. 4. In some embodiments, the actions in the workflow may be performed in different orders and with different, fewer or additional actions than those illustrated in FIG. 14. Multiple actions can be combined in some implementations.

FIG. 14 includes workflow 1400 that begins at step S14.1 when a participant 1402 of the token exchange system 204 requests withdrawal of a number of tokens from a blockchain address in the registry of blockchain addresses 404 to the withdrawal transaction processor 424. At step S14.2, the withdrawal transaction processor 424 executes a withdrawal blockchain transaction with the specified blockchain address as the source blockchain address and broadcasts the withdrawal blockchain transaction to the blockchain network 208. At step S14.3, the withdrawal transaction processor 424 updates the token balance of the specified blockchain address included in the detected deposit blockchain transaction in the registry of blockchain addresses 404.

Task Scheduling in the Token Exchange System

Figure 15:
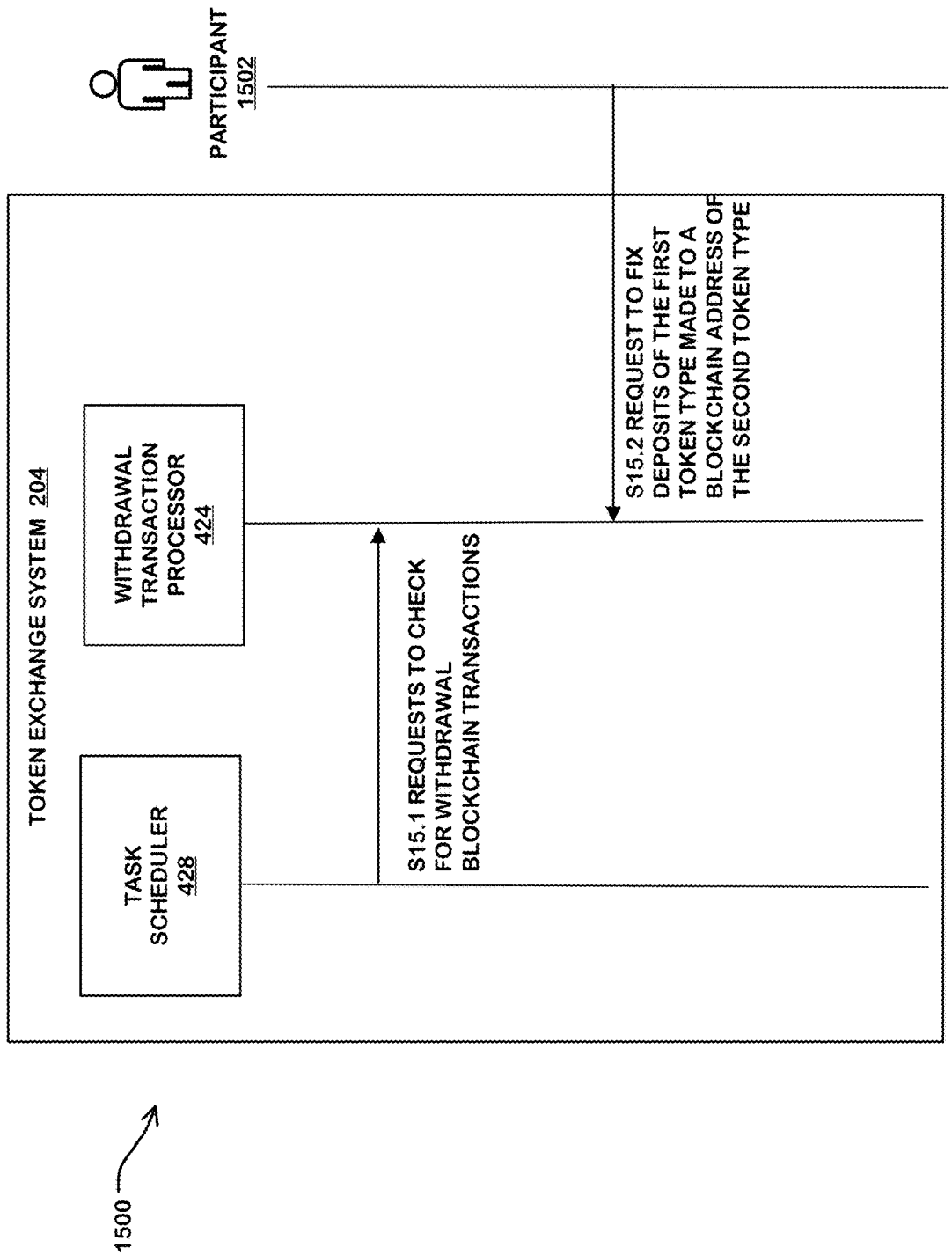
FIG. 15 is a sequence diagram illustrating a representative method of scheduling various tasks in the token exchange system by the task scheduler in FIG. 4.

FIG. 15 is an example workflow 1500 illustrating a representative method of scheduling various tasks by the task scheduler 428 in the token exchange system 204. In some embodiments, the actions in the workflow may be performed in different orders and/or with different, fewer or additional actions than those illustrated in FIG. 15. Multiple actions can be combined in some implementations.

In the workflow 1500, the task scheduler 428 schedules various tasks in the token exchange system 204, such as requesting the wrong token type transaction fixer 422 to check for new wrong token type blockchain transactions (step S15.1). In some embodiments, a participant 1502 can request the token exchange system 204 through the wrong token type transaction fixer 422 to fix a wrong token type blockchain transaction identified by the participant 1502.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for handling exchanges of a plurality of token types, the method comprising:
   receiving blockchain blocks from one or more blockchain networks, the blockchain blocks comprising blockchain transactions transferring tokens of a token type from a plurality of token types to blockchain addresses, the plurality of token types including at least a first token type and a second token type;
   identifying a wrong token type blockchain transaction in the blockchain blocks received from the blockchain networks, the wrong token type blockchain transaction transferring tokens of the first token type to a blockchain address associated with the second token type; and executing a fix token type blockchain transaction, the fix token type blockchain transaction transferring the tokens of the first token type from the blockchain address associated with the second token type to a blockchain address associated with the first token type.

2. The method of claim 1, further comprising maintaining a registry of blockchain addresses, the registry of blockchain addresses including blockchain addresses and token balances associated with respective blockchain addresses, and each of the blockchain addresses in the registry of blockchain addresses associated with a token type from a plurality of token types.

3. The method of claim 2 further comprising selecting the blockchain address associated with the first token type from the registry of blockchain addresses by matching an identifier of the blockchain address associated with the first token type with an identifier of the blockchain address associated with the second token type.

4. The method of claim 3, wherein the identifier of the blockchain address associated with the first token type and the identifier of the blockchain address associated with the second token type are a private key needed to sign blockchain transactions associated with the first token type and the blockchain address associated with the second token type.

5. The method of claim 4, wherein blockchain addresses that can have outgoing blockchain transactions signed with the private key have a common blockchain address format.

6. The method of claim 2, further comprising:
identifying deposit blockchain transactions in the blockchain blocks received from the blockchain networks, the deposit blockchain transactions transferring tokens to blockchain addresses in the registry of blockchain addresses; and
updating token balances of the blockchain addresses in the registry of blockchain addresses upon identification of the deposit blockchain transactions transferring tokens to the blockchain addresses.

7. The method of claim 2, further comprising:
executing withdrawal blockchain transactions, the withdrawal blockchain transactions transferring tokens from blockchain addresses in the registry of blockchain addresses; and
updating token balances of the blockchain addresses in the registry of blockchain addresses.

8. The method of claim 1, further comprising maintaining a registry of token exchange requests, token exchange requests in the registry of token exchange requests requesting exchanges of tokens of the first token type for tokens of the second token type.

9. The method of claim 8, further comprising:
receiving token exchange requests; and
adding the received token exchange requests to the registry of token exchange requests.

10. The method of claim 8, further comprising:
selecting a token exchange request from the registry of token exchange requests, the token exchange request requesting a first number of tokens of the first token type from a first blockchain address to tokens of the second token type to a second blockchain address;
executing a blockchain transaction transferring a first number of tokens of the first token type from the first blockchain address;

determining a second number of tokens of the second token type equivalent to the first number of tokens of the first token type on dependence upon a token exchange rate of the first token type and the second token type; and
executing a blockchain transaction transferring the second number of tokens of the second token type to the second blockchain address.

11. A node comprising:
a processor; and
a memory,
the processor including logic to:
receive blockchain blocks from one or more blockchain networks, the blockchain blocks comprising blockchain transactions transferring tokens of a token type from a plurality of token types to blockchain addresses, the plurality of token types including at least a first token type and a second token type;
identify a wrong token type blockchain transaction in the blockchain blocks received from the blockchain networks, the wrong token type blockchain transaction transferring tokens of the first token type to a blockchain address associated with the second token type; and
execute a fix token type blockchain transaction, the fix token type blockchain transaction transferring the tokens of the first token type from the blockchain address associated with the second token type to a blockchain address associated with the first token type.

12. The node of claim 11, the processor further including logic to:
maintain a registry of blockchain addresses, the registry of blockchain addresses including blockchain addresses and token balances associated with respective blockchain addresses, and each of the blockchain addresses in the registry of blockchain addresses associated with a token type from the plurality of token types.

13. The node of claim 12, the processor further including logic to:
select the blockchain address associated with the first token type from the registry of blockchain addresses by matching an identifier of the blockchain address associated with the first token type with an identifier of the blockchain address associated with the second token type.

14. The node of claim 13, wherein the identifier of the blockchain address associated with the first token type and the identifier of the blockchain address associated with the second token type are a private key needed to sign blockchain transactions associated with the first token type and the blockchain address associated with the second token type.

15. The node of claim 14, wherein blockchain addresses that can have outgoing blockchain transactions signed with the private key have a common blockchain address format.

16. The node of claim 12, the processor further including logic to:
identify deposit blockchain transactions in the blockchain blocks received from the blockchain networks, the deposit blockchain transactions transferring tokens to blockchain addresses in the registry of blockchain addresses; and
update token balances of the blockchain addresses in the registry of blockchain addresses upon identification of the deposit blockchain transactions transferring tokens to the blockchain addresses.

17. The node of claim 12, the processor further including logic to:
- execute withdrawal blockchain transactions, the withdrawal blockchain transactions transferring tokens from blockchain addresses in the registry of blockchain addresses; and
- update token balances of the blockchain addresses in the registry of blockchain addresses.

18. The node of claim 11, the processor further including logic to:
- maintain a registry of token exchange requests, token exchange requests in the registry of token exchange requests requesting exchanges of tokens of the first token type for tokens of the second token type.

19. The node of claim 18, the processor further including logic to:
- receive token exchange requests; and
- add the received token exchange requests to the registry of token exchange requests.

20. The node of claim 8, the processor further including logic to:
- select a token exchange request from the registry of token exchange requests, the token exchange request requesting a first number of tokens of the first token type from a first blockchain address to tokens of the second token type to a second blockchain address;
- execute a blockchain transaction transferring a first number of tokens of the first token type from the first blockchain address;
- determine a second number of tokens of the second token type equivalent to the first number of tokens of the first token type on dependence upon a token exchange rate of the first token type and the second token type; and
- execute a blockchain transaction transferring the second number of tokens of the second token type to the second blockchain address.

21. A computer program product, comprising:
- a non-transitory machine readable memory;
- a computer program stored in the memory, the computer program including instructions configured for execution of a procedure in a node, comprising:
  - receiving blockchain blocks from one or more blockchain networks, the blockchain blocks comprising blockchain transactions transferring tokens of a token type from a plurality of token types to blockchain addresses, the plurality of token types including at least a first token type and a second token type;
  - identifying a wrong token type blockchain transaction in the blockchain blocks received from the blockchain networks, the wrong token type blockchain transaction transferring tokens of the first token type to a blockchain address associated with the second token type; and
  - executing a fix token type blockchain transaction, the fix token type blockchain transaction transferring the tokens of the first token type from the blockchain address associated with the second token type to a blockchain address associated with the first token type.

22. The computer program product of claim 21, further including maintaining a registry of blockchain addresses, the registry of blockchain addresses including blockchain addresses and token balances associated with respective blockchain addresses, and each of the blockchain addresses in the registry of blockchain addresses associated with a token type from a plurality of token types.

23. The computer program product of claim 22 further comprising selecting the blockchain address associated with the first token type from the registry of blockchain addresses by matching an identifier of the blockchain address associated with the first token type with an identifier of the blockchain address associated with the second token type.

24. The computer program product of claim 23, wherein the identifier of the blockchain address associated with the first token type and the identifier of the blockchain address associated with the second token type are a private key needed to sign blockchain transactions associated with the first token type and the blockchain address associated with the second token type.

25. The computer program product of claim 24, wherein blockchain addresses that can have outgoing blockchain transactions signed with the private key have a common blockchain address format.

26. The computer program product of claim 22, further comprising:
- identifying deposit blockchain transactions in the blockchain blocks received from the blockchain networks, the deposit blockchain transactions transferring tokens to blockchain addresses in the registry of blockchain addresses; and
- updating token balances of the blockchain addresses in the registry of blockchain addresses upon identification of the deposit blockchain transactions transferring tokens to the blockchain addresses.

27. The computer program product of claim 22, further comprising:
- executing withdrawal blockchain transactions, the withdrawal blockchain transactions transferring tokens from blockchain addresses in the registry of blockchain addresses; and
- updating token balances of the blockchain addresses in the registry of blockchain addresses.

28. The computer program product of claim 21, further comprising maintaining a registry of token exchange requests, token exchange requests in the registry of token exchange requests requesting exchanges of tokens of the first token type for tokens of the second token type.

29. The computer program product of claim 28, further comprising:
- receiving token exchange requests; and
- adding the received token exchange requests to the registry of token exchange requests.

30. The computer program product of claim 28, further comprising:
- selecting a token exchange request from the registry of token exchange requests, the token exchange request requesting a first number of tokens of the first token type from a first blockchain address to tokens of the second token type to a second blockchain address;
- executing a blockchain transaction transferring a first number of tokens of the first token type from the first blockchain address;
- determining a second number of tokens of the second token type equivalent to the first number of tokens of the first token type on dependence upon a token exchange rate of the first token type and the second token type; and
- executing a blockchain transaction transferring the second number of tokens of the second token type to the second blockchain address.

31. A node comprising:
- a processor; and
- a memory, the processor including logic to:
receive blockchain blocks from one or more blockchain networks, the blockchain blocks comprising blockchain transactions transferring tokens of a token type from a plurality of token types to blockchain addresses, the plurality of token types including at least a first token type and a second token type;
maintain a registry of blockchain addresses, the registry of blockchain addresses including blockchain addresses and token balances associated with respective blockchain addresses, and each of the blockchain addresses in the registry of blockchain addresses associated with a token type from the plurality of token types;
identify deposit blockchain transactions in the blockchain blocks received from the blockchain networks, the blockchain transactions transferring tokens to blockchain addresses in the registry of blockchain addresses, and update the token balances of the blockchain addresses in the registry of blockchain addresses upon identification of deposit blockchain transactions transferring tokens to the blockchain addresses;
identify a wrong token type blockchain transactions in the blockchain blocks received from the blockchain networks, the wrong token type blockchain transaction transferring tokens of the first token type to a blockchain address associated with the second token type;
execute a fix token type blockchain transaction, the fix token type blockchain transaction transferring the tokens of the first token type from the blockchain address associated with the second token type to a blockchain address associated with the first token type;
execute withdrawal blockchain transactions, the blockchain transactions transferring tokens from blockchain addresses in the registry of blockchain addresses;
maintain a registry of token exchange requests, token exchange requests in the registry of token exchange requests requesting exchange of tokens of the first token type from a blockchain address associated with the first token type in the registry of blockchain addresses for tokens of the second token type to a blockchain address associated with a second token type in the registry of blockchain addresses;
receive a token exchange request, and add the received token exchange request to the registry of token exchange requests;
select a token exchange request from the registry of token exchange requests, execute a blockchain transaction transferring the tokens of the first token type from the blockchain address associated with the first token type; and execute a blockchain transaction transferring the tokens of the second token type to the blockchain address associated with the second token type.

32. A method for handling exchanges of a plurality of token types, the method comprising:
receiving blockchain blocks from one or more blockchain networks, the blockchain blocks comprising blockchain transactions transferring tokens of a token type from a plurality of token types to blockchain addresses, the plurality of token types including at least a first token type and a second token type;
maintaining a registry of blockchain addresses, the registry of blockchain addresses including blockchain addresses and token balances associated with respective blockchain addresses, and each of the blockchain addresses in the registry of blockchain addresses associated with a token type from the plurality of token types;
identifying deposit blockchain transactions in the blockchain blocks received from the blockchain networks, the blockchain transactions transferring tokens to blockchain addresses in the registry of blockchain addresses, and update the token balances of the blockchain addresses in the registry of blockchain addresses upon identification of deposit blockchain transactions transferring tokens to the blockchain addresses;
identifying a wrong token type blockchain transactions in the blockchain blocks received from the blockchain networks, the wrong token type blockchain transaction transferring tokens of the first token type to a blockchain address associated with the second token type;
executing a fix token type blockchain transaction, the fix token type blockchain transaction transferring the tokens of the first token type from the blockchain address associated with the second token type to a blockchain address associated with the first token type;
executing withdrawal blockchain transactions, the blockchain transactions transferring tokens from blockchain addresses in the registry of blockchain addresses;
maintaining a registry of token exchange requests, token exchange requests in the registry of token exchange requests requesting exchange of tokens of the first token type from a blockchain address associated with the first token type in the registry of blockchain addresses for tokens of the second token type to a blockchain address associated with a second token type in the registry of blockchain addresses;
receiving a token exchange request, and add the received token exchange request to the registry of token exchange requests;
selecting a token exchange request from the registry of token exchange requests, execute a blockchain transaction transferring the tokens of the first token type from the blockchain address associated with the first token type; and execute a blockchain transaction transferring the tokens of the second token type to the blockchain address associated with the second token type.

33. A computer program product, comprising:
a non-transitory machine readable memory;
a computer program stored in the memory, the computer program including instructions configured for execution of a procedure in a node, comprising:
receiving blockchain blocks from one or more blockchain networks, the blockchain blocks comprising blockchain transactions transferring tokens of a token type from a plurality of token types to blockchain addresses, the plurality of token types including at least a first token type and a second token type;
maintaining a registry of blockchain addresses, the registry of blockchain addresses including blockchain addresses and token balances associated with respective blockchain addresses, and each of the blockchain addresses in the registry of blockchain addresses associated with a token type from the plurality of token types;
identifying deposit blockchain transactions in the blockchain blocks received from the blockchain networks, the blockchain transactions transferring tokens to blockchain addresses in the registry of blockchain addresses, and update the token balances of the blockchain addresses in the registry of blockchain addresses upon identification of deposit blockchain transactions transferring tokens to the blockchain addresses;

identifying a wrong token type blockchain transactions in the blockchain blocks received from the blockchain networks, the wrong token type blockchain transaction transferring tokens of the first token type to a blockchain address associated with the second token type;

executing a fix token type blockchain transaction, the fix token type blockchain transaction transferring the tokens of the first token type from the blockchain address associated with the second token type to a blockchain address associated with the first token type;

executing withdrawal blockchain transactions, the blockchain transactions transferring tokens from blockchain addresses in the registry of blockchain addresses;

maintaining a registry of token exchange requests, token exchange requests in the registry of token exchange requests requesting exchange of tokens of the first token type from a blockchain address associated with the first token type in the registry of blockchain addresses for tokens of the second token type to a blockchain address associated with a second token type in the registry of blockchain addresses;

receiving a token exchange request, and add the received token exchange request to the registry of token exchange requests;

selecting a token exchange request from the registry of token exchange requests, execute a blockchain transaction transferring the tokens of the first token type from the blockchain address associated with the first token type; and execute a blockchain transaction transferring the tokens of the second token type to the blockchain address associated with the second token type.

\* \* \* \* \*